(12) United States Patent
Lupien et al.

(10) Patent No.: US 9,924,243 B2
(45) Date of Patent: Mar. 20, 2018

(54) ENVIRONMENT CONTROL DEVICE AND METHOD USING A WIFI INFRASTRUCTURE FOR EXCHANGING ENVIRONMENTAL DATA

(71) Applicant: Distech Controls, Inc, Brossard (CA)

(72) Inventors: Steve Lupien, Boucherville (CA); Pascal Gratton, Montréal (CA); Danny Breton, Saint-Jean sur Richelieu (CA)

(73) Assignee: DISTECH CONTROLS INC., Brossard (CA)

( * ) Notice: Subject to any disclaimer, the term of this patent is extended or adjusted under 35 U.S.C. 154(b) by 76 days.

(21) Appl. No.: 14/274,867

(22) Filed: May 12, 2014

(65) Prior Publication Data

US 2015/0098357 A1    Apr. 9, 2015

Related U.S. Application Data

(60) Provisional application No. 61/888,013, filed on Oct. 8, 2013.

(51) Int. Cl.
*H04Q 9/00* (2006.01)
*H04W 48/20* (2009.01)
(Continued)

(52) U.S. Cl.
CPC ............ *H04Q 9/00* (2013.01); *H04W 24/00* (2013.01); *H04W 48/20* (2013.01); *H04W 84/18* (2013.01);
(Continued)

(58) Field of Classification Search
CPC .... G05B 13/027; G05B 13/048; G05B 15/02; G05B 15/00; G05B 2219/2642;
(Continued)

(56) References Cited

U.S. PATENT DOCUMENTS 8,193,929 B1    6/2012  Siu et al.
9,210,125 B1 *  12/2015  Nichols ............... H04L 61/6081
(Continued)

FOREIGN PATENT DOCUMENTS

WO    2005006668 A1    1/2005

OTHER PUBLICATIONS

Conner et al., "IEEE 802.11s Tutorial, Overview of the Amendment for Wireless Local Area Mesh Networking", IEEE 802 Plenary, Dallas, Monday, Nov. 13, 2006.*
(Continued)

*Primary Examiner* — Joseph A Bednash
(74) *Attorney, Agent, or Firm* — RatnerPrestia

(57) ABSTRACT

The present disclosure relates to an environment control device (ECD) and a method using a wireless communication infrastructure for exchanging environmental data. The wireless communication infrastructure comprises a first Wi-Fi hotspot, and at least one of a second Wi-Fi hotspot and a mesh network. The ECD comprises a communication module for exchanging environmental data with at least another device over the wireless communication infrastructure. The communication module is capable of establishing the first Wi-Fi hotspot, associating with the second Wi-Fi hotspot, and communicating over the mesh network. The ECD further comprises a processing module capable of processing environmental data received from the other device via the wireless communication infrastructure, and/or transmitting generated environmental data to the other device via the wireless communication infrastructure. The ECD may consist of an environment controller, a sensor, a controlled appliance, and a relay for wired devices.

8 Claims, 17 Drawing Sheets

(51) Int. Cl.
*H04W 24/00* (2009.01)
*H04W 84/18* (2009.01)

(52) U.S. Cl.
CPC ..... *H04Q 2209/25* (2013.01); *H04Q 2209/43* (2013.01)

(58) Field of Classification Search
CPC .. G05B 2219/2614; G05B 2219/25168; G05B 2219/2639; H04W 4/008; H04W 4/005; H04W 8/005; H04W 8/22; H04W 12/08; H04W 16/00; H04W 16/26; H04W 16/28; H04W 24/04; H04W 40/244; H04W 48/18; H04W 48/20; H04W 52/0209; H04W 72/085; H04W 74/0816; H04W 84/10; H04W 84/18; H04W 88/04
See application file for complete search history.

(56) References Cited

U.S. PATENT DOCUMENTS

| | | | |
|---|---|---|---|
| 2004/0203498 A1 | 10/2004 | Kuo | |
| 2005/0232179 A1* | 10/2005 | daCosta | H04W 84/00 370/315 |
| 2008/0071899 A1* | 3/2008 | Odaka | H04L 41/06 709/223 |
| 2009/0066587 A1* | 3/2009 | Hayes | H01Q 1/2275 343/702 |
| 2011/0188391 A1* | 8/2011 | Sella | H04W 24/10 370/252 |
| 2012/0014362 A1 | 1/2012 | Inada | |
| 2012/0109404 A1* | 5/2012 | Pandey | H04L 67/12 700/299 |
| 2013/0163407 A1* | 6/2013 | Sinha | H04W 40/12 370/217 |

OTHER PUBLICATIONS

Sauter, Martin; "Evolution of Mobile Devices and Operating Systems"; 3G, 4G and Beyond—Bringing, Networks, Devices and the Web Together; Jan. 11, 2013; pp. 241-296; John Wiley & Sons LTD.; Chichester, UK.

Dubois, Daniel J et al.; "Lightweight Self-organizing Reconfiguration of Opportunistic Infrastructure-mode WiFi Networks"; 2013 IEEE 7th International Conference on Self-Adaptive and Self-Organizing Systems; Sep. 9, 2013; pp. 247-256; IEEE.

Masayuki, Hirafuji et al.; "Field Server Projects"; Applications and the Internet Workshops, 2007; Jan. 1, 2007; p. 75; IEEE.

* cited by examiner

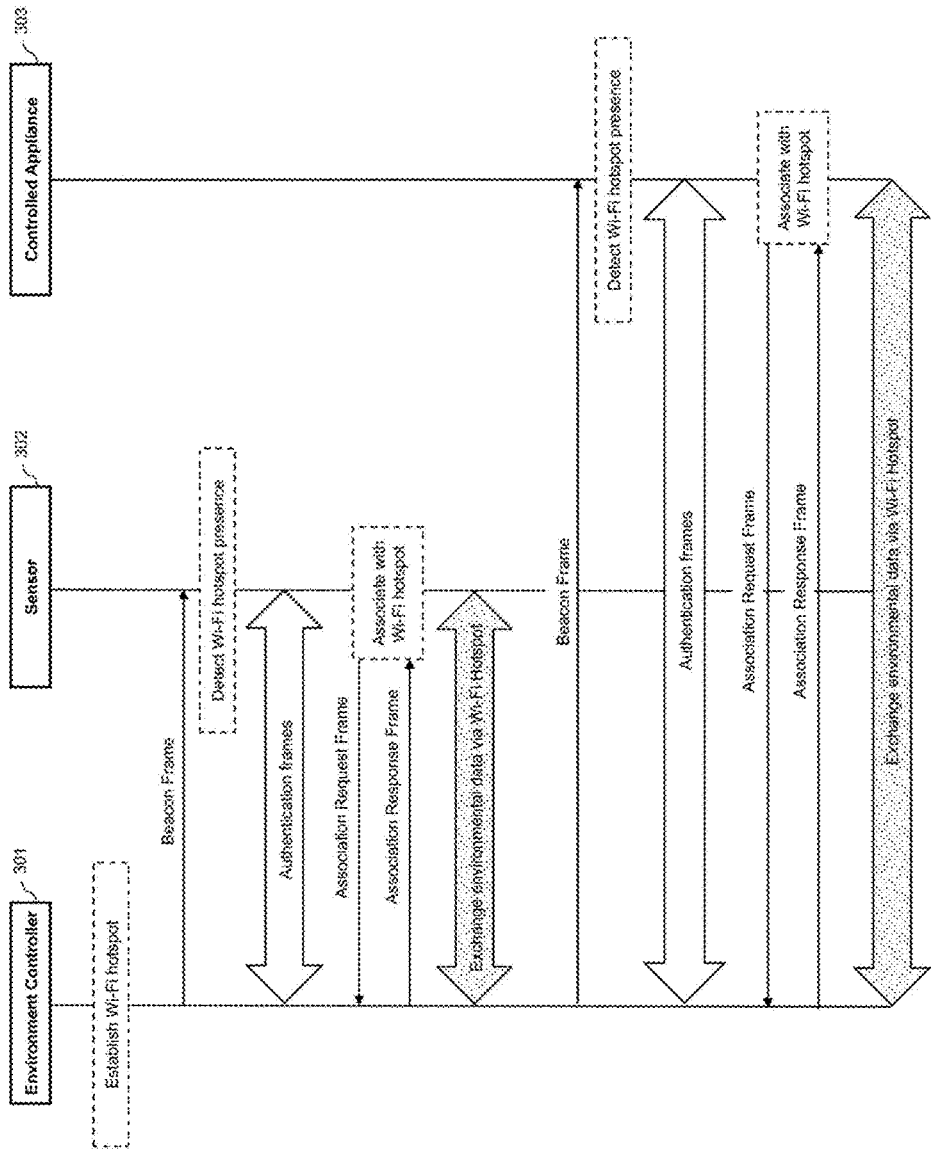

ENVIRONMENT CONTROL DEVICE AND METHOD USING A WIFI INFRASTRUCTURE FOR EXCHANGING ENVIRONMENTAL DATA

TECHNICAL FIELD

The present disclosure relates to the field of environment control systems. More specifically, the present disclosure relates to an environment control device and method using a WiFi infrastructure for exchanging environmental data.

BACKGROUND

Systems for controlling environmental conditions, for example in buildings, are becoming increasingly sophisticated. A control system may at once control heating and cooling, monitor air quality, detect hazardous conditions such as fire, carbon monoxide release, intrusion, and the like. Such control systems generally include at least one environment controller, which receives measured environmental values, generally from external sensors, and in turn determines set-points or command parameters to be sent to controlled appliances.

Communications between an environment controller and the devices under its control (sensors, controlled appliances) are currently based on wires. The wires are deployed in the building where the environment control system is operating, for instance in the walls, ceilings, and floors of multiple rooms in the building. Thus, deploying a new environment control system in a building implies deploying the wires used by the system for the communications between its components. Alternatively, upgrading an existing environment control system in a building (by the addition of new sensors, controlled appliances, or environment controllers) may imply upgrading the existing communication infrastructure used by the existing system, and thus deploying new wires. Deploying wires in a building is usually disrupting for the daily operations in the building and costly.

Therefore, there is a need for facilitating the deployment of a communication infrastructure between components of an environment control system, by using Wi-Fi communication technologies instead of wires. Further, there is a need to take into account legacy environment control systems, where some of the components may not be upgradable from wires to Wi-Fi communication technologies.

SUMMARY

In accordance with a first aspect, the present disclosure relates to an environment control device (ECD). The ECD comprises a communication module, for exchanging environmental data with at least another device. The communication module comprises Wi-Fi hotspot functionality for establishing a first Wi-Fi hotspot and exchanging the environmental data over the first Wi-Fi hotspot. The communication module also comprises at least one of: Wi-Fi client functionality for associating with a second Wi-Fi hotspot and exchanging the environmental data over the second Wi-Fi hotspot, and WiFi mesh client functionality for exchanging the environmental data over a mesh network.

The ECD may also comprise a processing module, for receiving environmental data from the other device via the communication module and processing the received environmental data, and/or generating environmental data and transmitting the generated environmental data to the other device via the communication module.

In accordance with a second aspect, the present disclosure relates to an environment control method. The environment control method comprises establishing by an ECD a first Wi-Fi hotspot, and exchanging environmental data between the ECD and at least another device via the first Wi-Fi hotspot. The environment control method also comprises at least one of: associating the ECD with a second Wi-Fi hotspot and exchanging environmental data between the ECD and at least another device over the second Wi-Fi hotspot, and exchanging environmental data between the ECD and at least another device over a mesh network. The first Wi-Fi hotspot and the at least one of the second Wi-Fi hotspot and the mesh network define a wireless communication infrastructure.

Exchanging environmental data may consist of receiving at the ECD environmental data from the other device via the wireless communication infrastructure and processing the received environmental data, and/or generating at the ECD environmental data and transmitting the generated environmental data to the other device via the wireless communication infrastructure.

In accordance with another aspect of the present ECD and method, a USB key implementing the communication module performs at least one of: the establishment of the first Wi-Fi hotspot and the exchange of environmental data over the first Wi-Fi hotspot, the association with the second Wi-Fi hotspot and the exchange of environmental data over the second Wi-Fi hotspot, and the exchange of environmental data over the mesh network.

In accordance with another aspect of the present ECD and method, the ECD consists of an environment controller. The environment controller is capable of receiving an environmental characteristic value from one of a sensor or a relay via the wireless communication infrastructure, and determining an environmental state based on the environmental characteristic value; and generating a command based on the environmental state, and transmitting the command to one of a controlled appliance or a relay via the wireless communication infrastructure.

In accordance with another aspect of the present ECD and method, the ECD consists of a sensor. The sensor is capable of measuring an environmental characteristic and providing a corresponding environmental characteristic value; and transmitting the environmental characteristic value to an environment controller via the wireless communication infrastructure.

In accordance with another aspect of the present ECD and method, the ECD consists of a controlled appliance. The controlled appliance is capable of receiving a command from an environment controller via the wireless communication infrastructure and executing the command.

In accordance with another aspect of the present ECD and method, the ECD consists of a relay. The relay is capable of one of: receiving an environmental characteristic value from a sensor via a wire and transmitting the environmental characteristic value to an environment controller via the wireless communication infrastructure, or receiving a command from an environment controller via the wireless communication infrastructure and transmitting the command to a controlled appliance via a wire.

BRIEF DESCRIPTION OF THE DRAWINGS

Embodiments of the disclosure will be described by way of example only with reference to the accompanying drawings, in which:

FIGS. 9A and 9B illustrate an exemplary Wi-Fi hotspot signal flow for the present environment control method;

DETAILED DESCRIPTION

Figure 1:
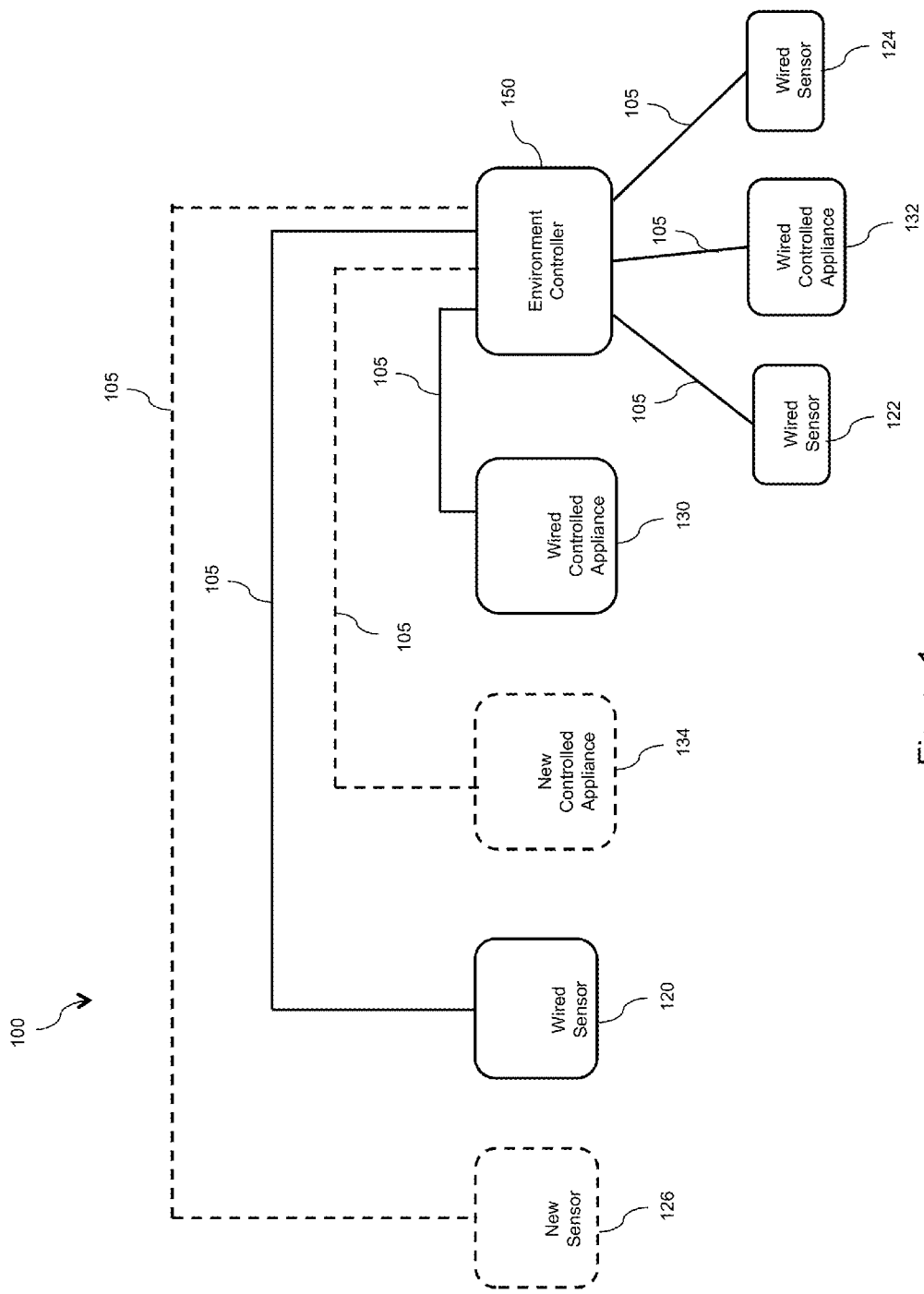
FIG. 1 illustrates a legacy environment control system using wires for exchanging environmental data between its components.

The foregoing and other features will become more apparent upon reading of the following non-restrictive description of illustrative embodiments thereof, given by way of example only with reference to the accompanying drawings. Like numerals represent like features on the various drawings.

Various aspects of the present disclosure generally address one or more of the problems related to the deployment and usage of a wireless communication infrastructure for exchanging environmental data between components of an environment control system.

Terminology

The following terminology is used throughout the present disclosure:

Environment: condition(s) (temperature, pressure, oxygen level, light level, security, etc.) prevailing in a controlled area or place, such as for example in a building.

Environment control system: a set of components which collaborate for monitoring and controlling an environment.

Environmental data: any data (e.g. information, commands) related to an environment that may be exchanged between components of an environment control system.

Environment control device (ECD): generic name for a component of an environment control system. An ECD may consist of an environment controller, a sensor, a controlled appliance, etc.

Environment controller: device capable of receiving information related to an environment and sending commands based on such information.

Environmental characteristic: measurable, quantifiable or verifiable property of an environment.

Environmental characteristic value: numerical, qualitative or verifiable representation of an environmental characteristic.

Sensor: device that detects an environmental characteristic and provides a numerical, quantitative or verifiable representation thereof. The numerical, quantitative or verifiable representation may be sent to an environment controller.

Controlled appliance: device that receives a command and executes the command. The command may be received from an environment controller.

Processing module: processor, computer, or like device or component capable of executing mathematical or logical operations and execute code.

Environmental state: a current condition of an environment based on an environmental characteristic, each environmental state may comprise a range of values or verifiable representation for the corresponding environmental characteristic.

Communication module: device or component capable of providing communication functionalities based on a specific communication technology (for example a standardized or proprietary wired communication technology, or a standardized or proprietary wireless communication technology). A specific protocol or set of protocols corresponding to the specific communication technology is implemented by the communication module. The communication module may support several communication technologies simultaneously (e.g. wired and wireless, two different wireless technologies, etc.).

Wi-Fi: any Wireless Local Area Network (WLAN) product that is based on the Institute of Electrical and Electronics Engineers' (IEEE) 802.11 standards.

Wi-Fi hotspot: communication infrastructure allowing communications between devices using communication protocols based on the 802.11 standards. The hotspot is established by a dedicated device (e.g. a Wi-Fi Access Point). A device needs to associate with the Wi-Fi hotspot, before being capable of using it for communications with other devices. The dedicated device establishing the Wi-Fi hotspot is associated by default.

Mesh network: communication infrastructure in which each participating node relays data for the network. Each node cooperates in the distribution of data in the network and there is usually more than one path for transmitting data from a source node to a destination node (thus providing greater reliability and flexibility). In the present disclosure, the term mesh network refers to a wireless mesh network, based on a wireless mesh protocol such as IEEE 802.11s.

Legacy Environment Control System Using Wires for Communications

Referring now to FIG. 1, a legacy environment control system 100 deployed in a controlled area such as a building (not represented in FIG. 1), as known in prior art, is illustrated. The environment control system 100 comprises several ECDs: an environment controller (150), sensors (120, 122, and 124), and controlled appliances (130 and 132). All these ECDs are interconnected by wires 105, in order to exchange environmental data and commands. For example, the sensor 122 transmits environmental characteristic values to the environment controller 150 via a wire 105, and the environment controller 150 transmits commands to the controlled appliance 132 via another wire 105.

The environment control system 100 is upgraded with a new sensor 126 and a new controlled appliance 134. In order to perform the upgrade, additional wires 105 shall be added to the building, to connect the new sensor 126 and the new controlled appliance 134 to the environment controller 150. It may be possible to partially leverage existing wires.

However, in the general case, it is necessary to upgrade the building to incorporate the missing wires for interconnecting the additional ECDs with the existing ECDs. As already mentioned, this type of upgrade is usually disrupting, costly, and time consuming.

The legacy environment control system 100 illustrates the need for ECDs interconnected by other means than wires, facilitating upgrades and addition of new ECDs on a per-needed basis.

Environment Control Device and Method Using a Wireless Communication Infrastructure for Exchanging Environmental Data The present disclosure relates to an ECD and a method using a wireless communication infrastructure for exchanging environmental data between the ECD and at least another device.

Figure 2:
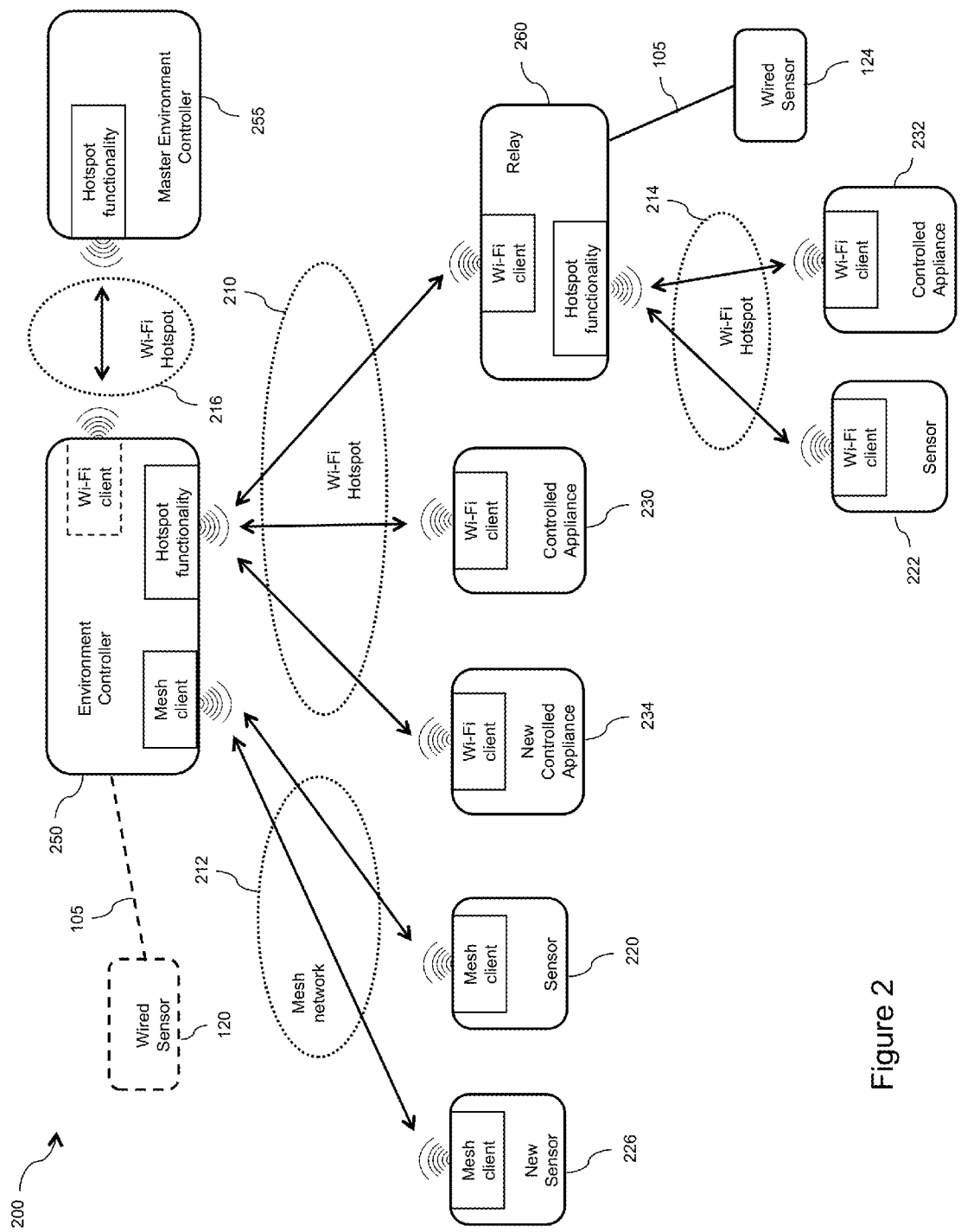
FIG. 2 illustrates an environment control system with environment control devices (EGDs) using Wi-Fi hotspots and mesh networks for exchanging environmental data.

Referring now to FIG. 2, an environment control system 200 comprising ECDs using a wireless communication infrastructure for exchanging environmental data is represented.

One (or more) ECD of the environment control system 200 is capable of establishing a first Wi-Fi hotspot, and exchanging environmental data between the ECD and at least another device over the first Wi-Fi hotspot. The ECD is further capable of at least one of: associating with a second Wi-Fi hotspot and exchanging environmental data between the ECD and at least another device over the second Wi-Fi hotspot, and exchanging environmental data between the ECD and at least another device over a mesh network. The wireless communication infrastructure comprises the first Wi-Fi hotspot, and one of the second Wi-Fi hotspot and the mesh network (or both). The environment control system 200 comprises two such ECDs: an environment controller 250 and a relay 260.

The environment controller 250 establishes a first Wi-Fi hotspot 210 and exchanges environmental data with ECDs 230, 234 and 260 over the first Wi-Fi hotspot 210. The environment controller 250 also exchanges environmental data with ECDs 220 and 226 over a mesh network 212.

The relay 260 establishes a Wi-Fi hotspot 214 and exchanges environmental data with ECDs 222 and 232 over the Wi-Fi hotspot 214. The relay 260 also associates with the first Wi-Fi hotspot 210 and exchanges environmental data with the environment controller 250 over the first Wi-Fi hotspot 210.

The environment controller 250 may also optionally associate with a second Wi-Fi hotspot (e.g. 216) and exchange environmental data with at least another ECD (e.g. master environment controller 255) over the second Wi-Fi hotspot (e.g. 216). The master environment controller 255 may be controlling a plurality of environment controllers (such as 250), using the second Wi-Fi hotspot 216.

The ECDs 230 and 234 have a communication module only capable of associating with the first Wi-Fi hotspot 210 and exchanging environmental data over the first Wi-Fi hotspot 210. Similarly, the ECDs 222 and 232 have a communication module only capable of associating with the Wi-Fi hotspot 214 and exchanging environmental data over the Wi-Fi hotspot 214. The ECDs 220 and 226 have a communication module only capable of exchanging environmental data over the mesh network 212. The environment controller 250 has a communication module capable of establishing the first Wi-Fi hotspot 210, optionally associating with the second Wi-Fi hotspot 216; and exchanging environmental data over the first Wi-Fi hotspot 210, optionally over the second Wi-Fi hotspot 216, and over the mesh network 212. The relay 260 has a communication module capable of establishing the Wi-Fi hotspot 214, associating with the first Wi-Fi hotspot 210; and exchanging environmental data over the Wi-Fi hotspots 214 and 210. The wireless communication infrastructure of the environment control system 200 for exchanging environmental data consists of the Wi-Fi hotspots 210, 212 and 216, and the mesh network 212.

Exchanging environment data between the environment controller 250 and other ECDs (e.g. 220, 226, 230, 234, 260 and 255) may consist in receiving environmental data from one of the other ECDs via one of the Wi-Fi hotspots 210, 216 and the mesh network 212; and processing the received environmental data at the environment controller 250. Alternatively or complementarily, it may also consist in generating environmental data at the environment controller 250; and transmitting the generated environmental data to one (or several) of the other devices via one of the Wi-Fi hotspots 210, 216 and the mesh network 212.

Exchanging environment data between the relay 260 and other ECDs (e.g. 250, 222 and 232) may consist in receiving environmental data from one of the other ECDs via one of the Wi-Fi hotspots 210 and 214; and processing the received environmental data at the relay 260. Alternatively or complementarily, it may also consist in generating environmental data at the relay 260; and transmitting the generated environmental data to one (or several) of the other devices via one of the Wi-Fi hotspots 210 and 214.

Several types of ECDs may exchange environmental data and/or commands via the wireless communication infrastructure: environment controllers (e.g. 250 and 255), sensors (e.g. 220, 226 and 222), controlled appliances (e.g. 230, 234 and 232), and relays (e.g. 260). However, the present system and method are not limited to such a configuration, and other types of devices may exchange environmental data and/or commands over the present wireless communication infrastructure.

The environment control system 200 illustrates a situation where the ECDs capable of communicating via the Wi-Fi hotspots and mesh network coexist with ECDs only capable of communicating via wires 105. The latter includes for example a wired sensor 124. In such a configuration, the relay 260 acts as an interconnection point between the environment controller 250 and the wired ECD 124. The relay 260 is capable of communicating with the environment controller 250 over the first Wi-Fi hotspot 210, and is also capable of communicating with the wired ECD 124 over the wire 105. The environment controller 250 could also have the capability to communicate directly with wired ECDs (e.g. a wired sensor 120) over wires 105 instead of interconnecting therewith through the relay 260.

The ECDs (220, 226, 230, 234, 222, 232, 250 and 260) may have native Wi-Fi and mesh functionalities, or may be upgraded when possible to include Wi-Fi and mesh functionalities. For example, the sensor 220 (corresponding to the wired sensor 120 of FIG. 1) and the controlled appliance 230 (corresponding to the wired controlled appliance 130 of FIG. 1) may have been upgraded respectively with a mesh client functionality and with a Wi-Fi client functionality, which allows them to exchange environmental data over the mesh network 212 and the first Wi-Fi hotspot 210 with the environment controller 250. The environment controller 150 of FIG. 1 may have been replaced by the environment controller 250, which has native mesh client and Wi-Fi hotpot functionalities.

Some of the ECDs, such as for example the sensor 124, may be devices which cannot be upgraded with a Wi-Fi client functionality (and cannot be replaced by a new sensor with a Wi-Fi client functionality), and only communicate over wires 105 (e.g. with the relay 250). Thus the present system and method allow gradual upgrade and modernizing of an environment control system 200, by gradually upgrading the ECDs or changing the ECDs so as to include Wi-Fi and mesh functionalities. Furthermore, by concurrently supporting both Wi-Fi/mesh functionality and wires, the present system and method allows leveraging of the current environment control infrastructure, while providing a cost efficient alternative to optimize, modify and/or expand the functions performed by the environment control system 200.

Environment Control Device

Referring now to FIGS. 2, 3A, 3B, 3C, 3D and 4 concurrently, a general schematic representation of components of an ECD having capabilities of establishing a first Wi-Fi hotspot 210, as well as associating with a second Wi-Fi hotspot 216 or/and communication over a mesh network 212 is illustrated. The ECD 300 comprises a communication module 310. The communication module 310 comprises a Wi-Fi hotspot functionality 312, which allows the ECD 300 to establish the first Wi-Fi hotspot 210 to exchange environmental data and/or commands with at least one other ECD 400. The communication module 310 also comprises at least one of the following functionalities: a Wi-Fi client functionality 314, which allows the ECD 300 to associate with the second Wi-Fi hotspot 216 to exchange environmental data and/or commands with at least one other ECD 400; and a mesh client functionality 316, which allows the ECD 300 to exchange environmental data and/or commands with at least one other ECD 400 over the mesh network 212. As mentioned previously, the combination of the first Wi-Fi hotspot 210 and at least one of the second Wi-Fi hotspot 216/mesh network 212 is referred to as the wireless network infrastructure 318.

The ECD 300 also comprises a processing module 320. The processing module 320 receives environmental data transmitted by the other device 400 via the wireless communication infrastructure 318 through the communication module 310. The processing module 320 further processes the received environmental data. The processing module 320 may also be capable of generating commands, and transmitting the commands to the other device 400 via the wireless communication infrastructure 318 through the communication module 310.

For example, the processing module 320 may receive an indication of a motion in a room from a motion detector, determine an occupancy of the room, and determine an appropriate temperature and/or humidity for the occupied room. The processing module 320 may further generate commands to activate a heating or cooling device, a humidity regulation device, etc. In another example, the processing module 320 may receive a current value of a temperature or a humidity in a room from a sensor, and determine a difference between the current value and a target value for the room. The processing module 320 may further generate commands to regulate a heating or cooling device, a humidity regulation device, etc. The target value may depend of the time during the day (e.g. working hours or night), of the day during the week (e.g. working day or week end), etc.

From an implementation perspective, the processing module 320 and the communication module 310 are generally two independent components of the ECD 300. They communicate via dedicated means, such as an internal communication bus 321. Thus, environmental data from the other device 400 are first received by the communication module 310, and then transmitted to the processing module 320 via the internal communication bus 321. Similarly, commands generated by the processing module 320 are first transmitted to the communication module 310 via the internal communication bus 321, and then transmitted by the communication module 310 over the wireless communication infrastructure 318 to the other device 400.

The ECD 300 also comprises a memory 330. The memory 330 is capable of storing environmental data received via the wireless communication infrastructure 318. The memory 330 is also capable of storing data which result from the processing (by the processing module 320) of environmental data received via the wireless communication infrastructure 318. Although the memory 330 is shown as a single box on FIG. 3A, those skilled in the art will understand that the memory 330 could consist of a single memory unit, or of a plurality of independent memory units. The data stored in the memory 330 could further include for each data stored a timestamp, and an identification of the other device 400.

The ECD 300 may also comprise a display 340. The display 340 may display environmental data received via the wireless communication infrastructure 318, or data which result from the processing (by the processing module 320) of environmental data received via the wireless communication infrastructure 318. Alternatively, the display 340 may display the status of all other devices 400 with which the environment control device 300 is in communication.

The ECD 300 may also comprise a user interface 350. For example, the user interface 350 may be used to receive inputs from a user, with respect to environmental data which are then further transmitted via the wireless communication infrastructure 318 to the other device 400. The user interface 350 could be implemented by means of a touchscreen display.

Communication Module

Figure 3A:
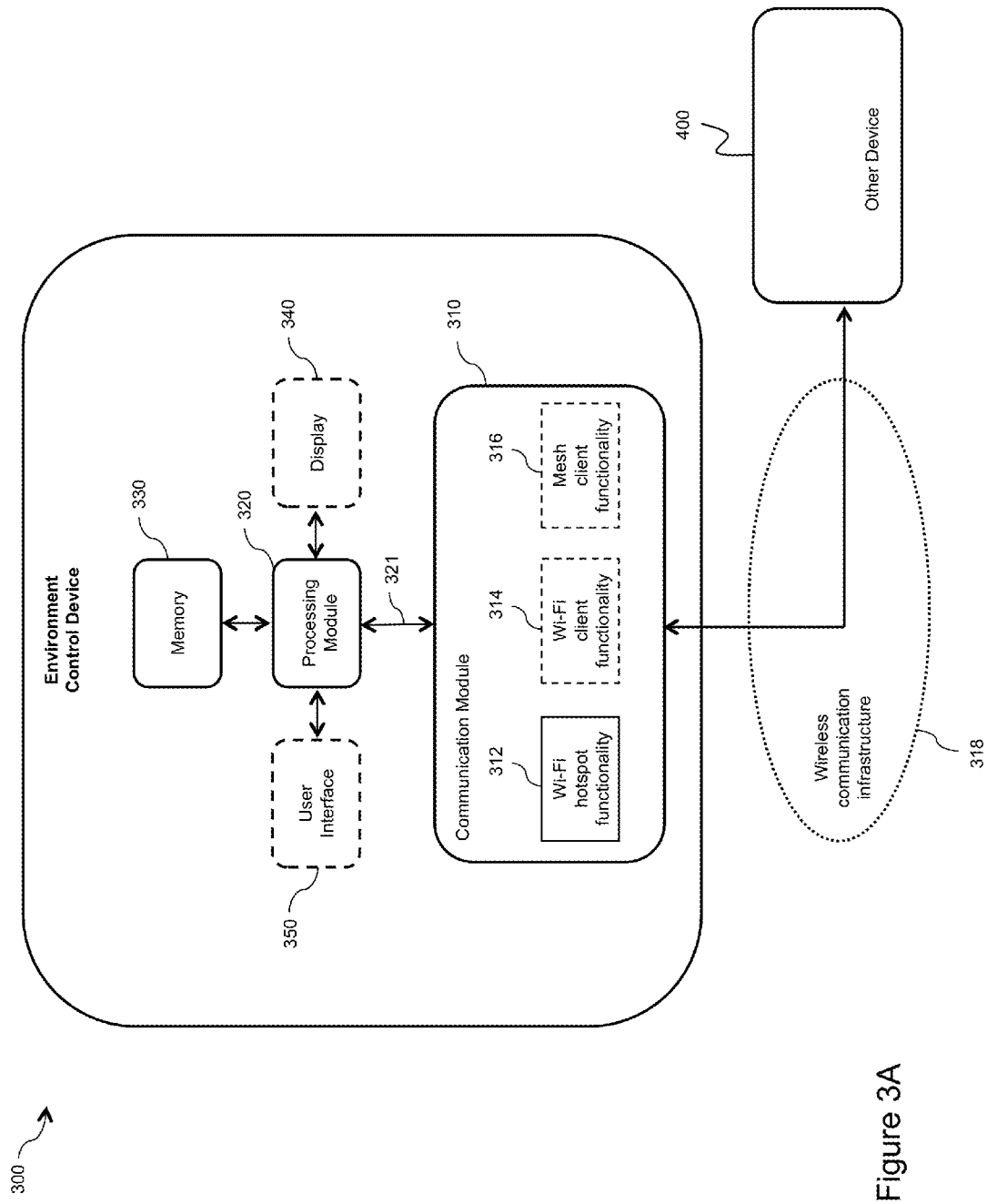
FIGS. 3A, 3B, 3C and 3D illustrate an ECD with a communication module for exchanging environmental data over a wireless communication infrastructure.
Figure 3B:
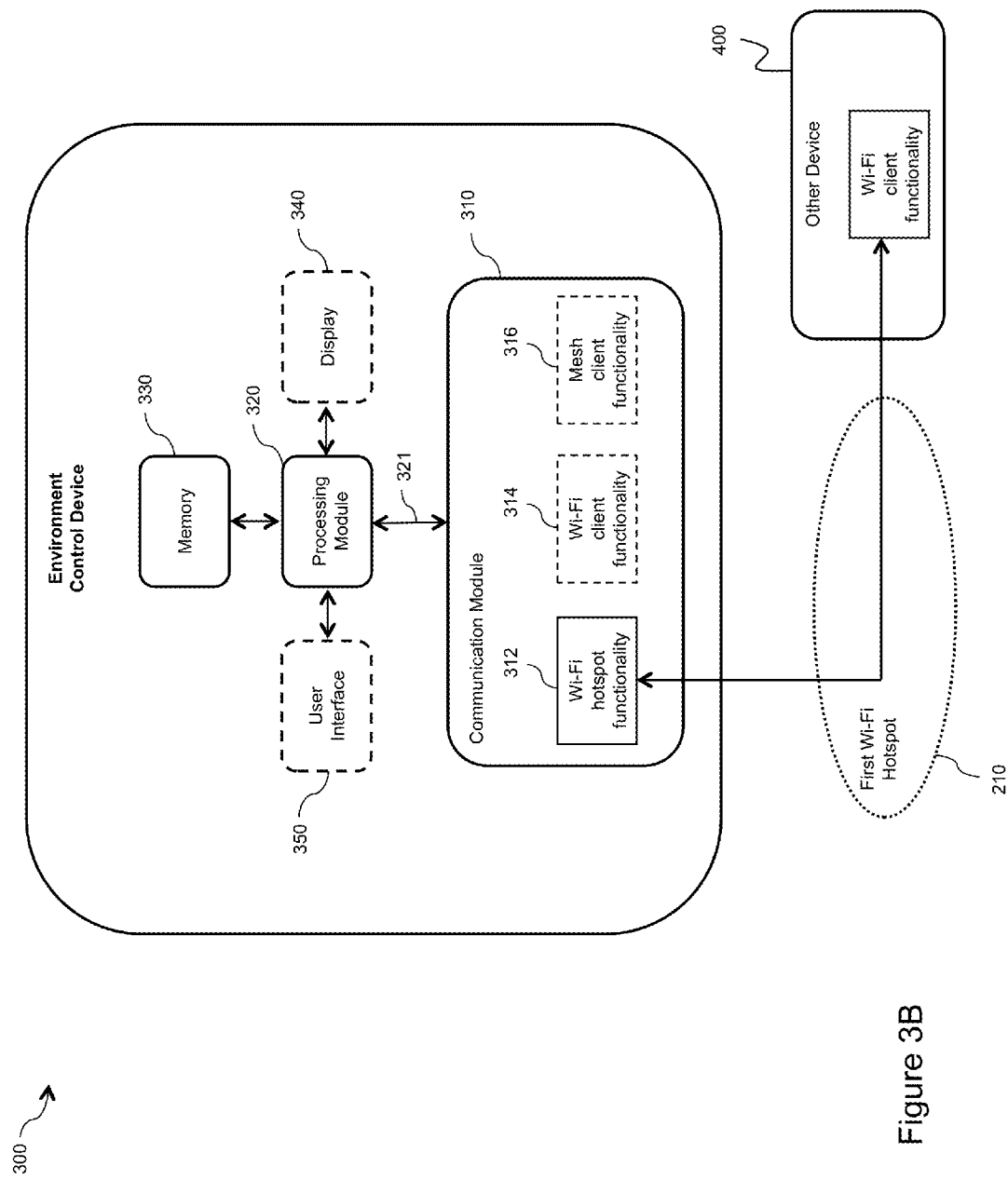

FIG. 3B focuses on the Wi-Fi hotspot functionality 312 of the communication module 310. The Wi-Fi hotspot functionality 312 allows the ECD 300 to establish the first Wi-Fi hotspot 210, as known in the art and specified by the corresponding industry standards. Once the first Wi-Fi hotspot 210 is established, another device 400 (using a Wi-Fi client functionality of the other device 400) can associate therewith, and communicate over, the first Wi-Fi hotspot 210 established by the ECD 300. The ECD 300 also uses its Wi-Fi hotspot functionality 312 to communicate over the established first Wi-Fi hotspot 210 with the other device 400.

Figure 3C:
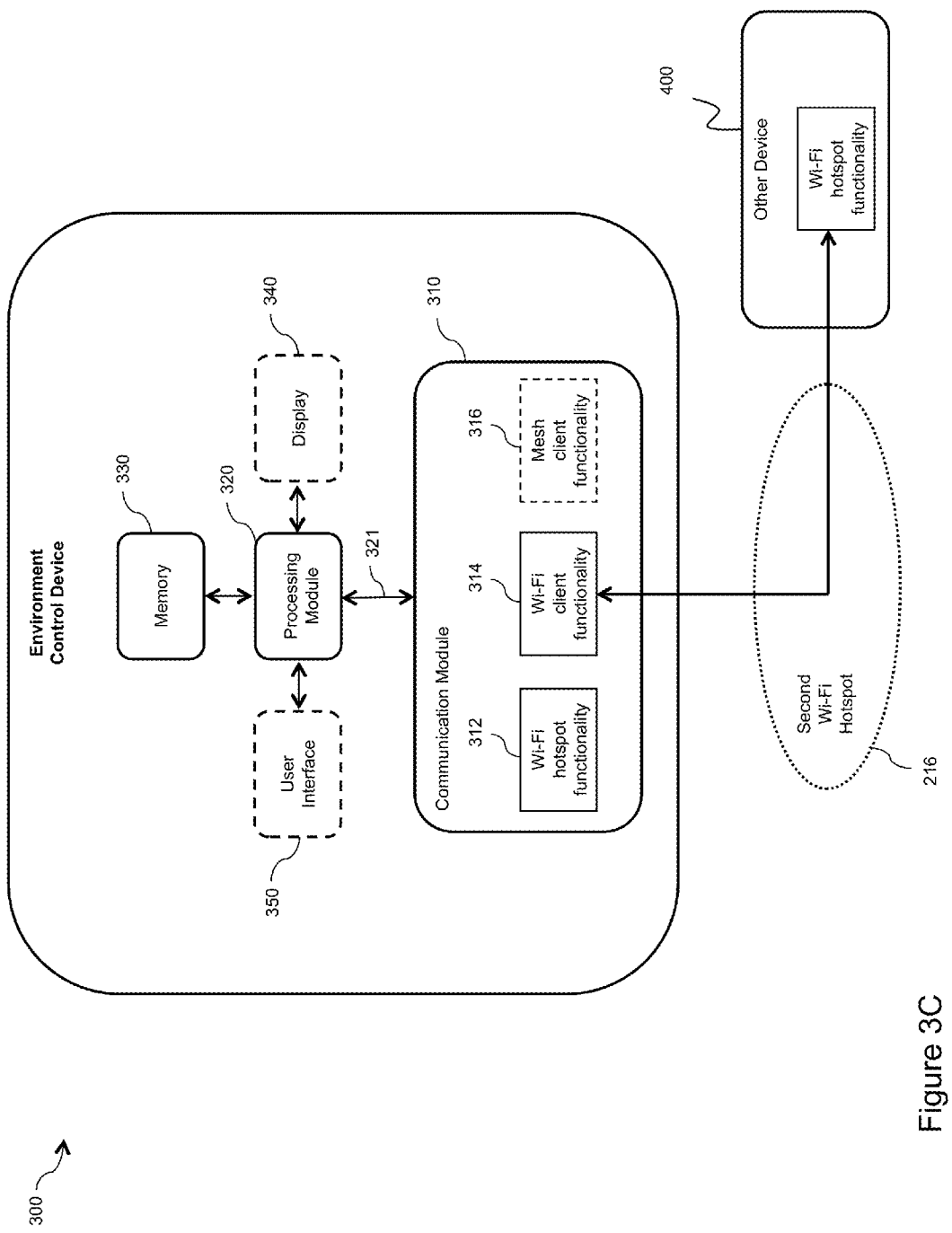

FIG. 3C focuses on the Wi-Fi client functionality 314 of the communication module 310. The Wi-Fi client functionality 314 allows the ECD 300 to associate with, and communicate over, a second Wi-Fi hotspot 216 which has been established by another device 400 (using a Wi-Fi hotspot functionality of the other device 400). The association of the Wi-Fi client functionality 314 with the Wi-Fi hotspot functionality of the other device 400 is performed in any manner known in the art.

Figure 3D:
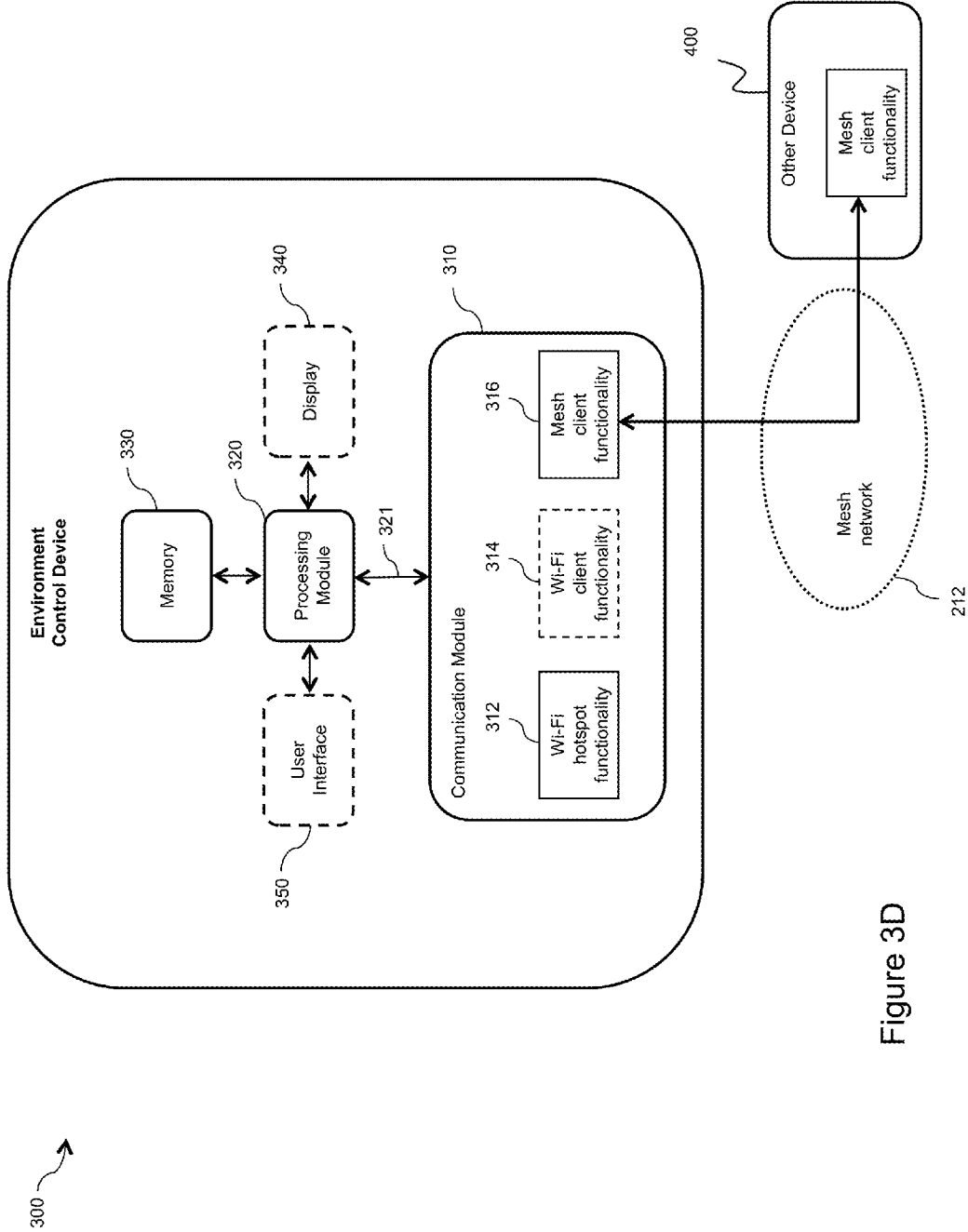

FIG. 3D focuses on the mesh client functionality 316 of the communication module 310. The mesh client functionality 316 allows the ECD 300 to communicate over a mesh network 212 with another device 400 (using a mesh client functionality of the other device 400). The communication between nodes (e.g. 300 and 400) over the mesh network 212 is performed in any manner known in the art.

Various configurations of the communication module 310 are possible. The communication module 310 may have only the Wi-Fi hotspot functionality 312 and the Wi-Fi client functionality 314. Alternatively, the communication module 310 may have only the Wi-Fi hotspot functionality 312 and the mesh client functionality 316. In still another alternative, the communication module 310 may have the Wi-Fi hotspot functionality 312, the Wi-Fi client functionality 314 and the mesh client functionality 316. In yet another alternative, the Wi-Fi client functionality 314 and the mesh client functionality 316 may be both supported by the communication module 310, but only one of the two may be activated and used to exchange environmental data between the ECD 300 and another device 400. Having both the Wi-Fi client functionality 314 and the mesh client functionality 316 may be particularly useful for providing standardized ECDs and allowing flexible deployment of the environmental control system 200. Standardized ECDs 300 can then be used for the deployment of the environment control system 200, and interrelationships with other devices 400 established and/or modified during the deployment of the environmental control system 200, by activating one or the other (or both) of the Wi-Fi client functionality 314 and the mesh client functionality 316.

The Wi-Fi hotspot functionality 312, the Wi-Fi client functionality 314 and the mesh client functionality 316 may be associated with different virtual ports. An application software executed by the processing module 320 may use a specific virtual port associated with one of the functionalities (312, 314 or 316) for exchanging environmental data with another device 400 via this specific functionality (312, 314 or 316). These virtual ports provide an abstraction layer for the application software executed by the processing module 320. The application software interfaces with the wireless communication infrastructure 318 as a whole; and is not aware of the underlying first Wi-Fi hotspot 210, and second Wi-Fi hotspot 216 or/and mesh network 212. The usage of the appropriate specific virtual port for communicating with a specific other device 400 is determined by a communication software layer that may be executed by the processing module 320 or the communication module 310.

The functionalities 312, 314 and 316 of the communication module 310 generally consist of a combination of hardware components and software executed by these hardware components. FIGS. 3A, 3B, 3C and 3D represent the communication module 310 being integrated with the ECD 300 as an internal component. ECDs 300 may be designed to natively support the capability to communicate with other devices 400 via the functionalities (312, 314 or/and 316) of the communication module 310. Alternatively, the hardware and/or software of ECDs 300 may be upgraded to provide at least one of the functionalities (312, 314 or 316) of the communication module 310.

Figure 4:
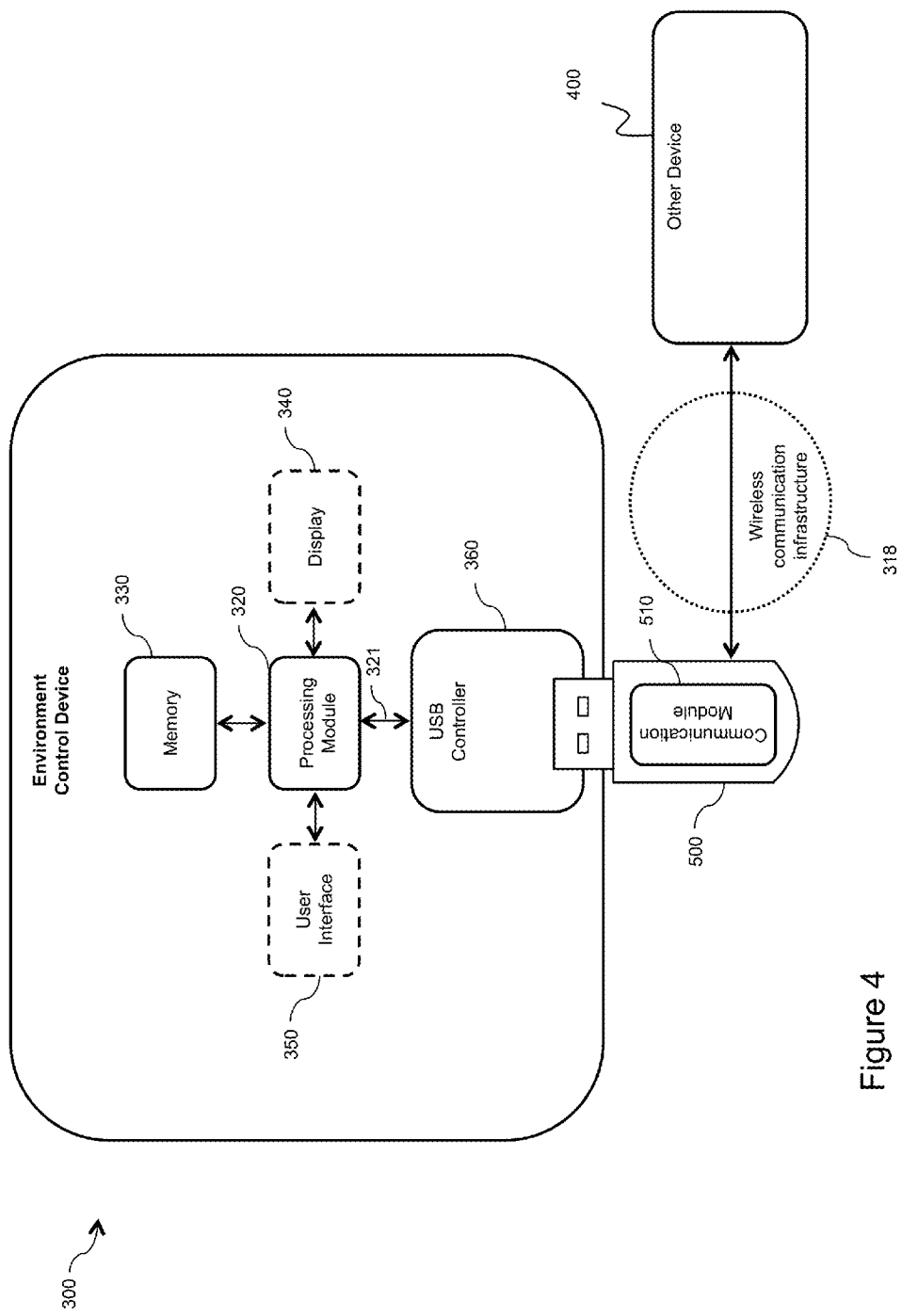
FIG. 4 illustrates an ECD with a communication module integrated on a USB key.

FIG. 4 represents the ECD 300 with a communication module 510 provided via a USB key 500. Such an implementation may be used for legacy ECDs, originally using a wired communication module (not represented in FIG. 4) to communicate with other devices, and which cannot be upgraded with an additional communication module 310 internally integrated within the ECD 300 (as illustrated in FIGS. 3A to 3D). In this particular implementation of the communication module 510, the legacy ECD 300 must comprise a native USB controller 360, or be upgraded to integrate the USB controller 360. Thus, the legacy ECD 300 acquires the capability of communicating with other devices 400 via the wireless communication infrastructure 318, using the communication module 510 implemented through the USB key 500 (when inserted in the USB controller 360 and initialized by the processing module 320). Additionally, a software upgrade of the ECD 300 may be needed. The software upgrade consists in providing the capability to the processing module 320 to use and control the communication module 510 implemented on the USB key 500. Although not represented in FIG. 4 for simplification purposes, the communication module 510 comprises a Wi-Fi hotspot functionality 312, and at least one of a Wi-Fi client functionality 314 and a mesh client functionality 316.

Alternatively, an ECD 300 may comprise an integrated communication module 310 providing only some of the Wi-Fi hotspot functionality 312, Wi-Fi client functionality 314 and mesh client functionality 316. The missing functionalities may be provided via an USB controller 360 and a communication module 510 implemented through a USB key 500.

Legacy ECDs, like environment controllers, which are currently deployed in buildings, and which only use wires as communication means, may either have a USB controller 360, or may be cost efficiently retrofitted to include a USB controller 360.

Environment Controller

Referring now to FIGS. 5, 9A, 9B, 10A and 10B concurrently, an environment controller 301 is illustrated. The environment controller 301 is a specific type of ECD capable of receiving an environmental characteristic value from one of a sensor 302 or a relay 304 (the relay 304 relays the environmental characteristic value from a sensor not represented in FIG. 5 to the environment controller 301) via the wireless communication infrastructure 318. The environment controller 301 is also capable of generating a command based on a processing of received environmental characteristic value(s), and transmitting the command to one of a controlled appliance 303 or a relay 304 (the relay 304 relays the command from the environment controller 301 to a controlled appliance not represented in FIG. 5) via the wireless communication infrastructure 318. As previously mentioned, the wireless communication infrastructure 318 comprises a first Wi-Fi hotspot 210 established by the environment controller 301, and at least one of a second Wi-Fi hotspot (not represented in FIG. 5) to which the environment controller 301 is associated and a mesh network (not represented in FIG. 5).

The environment controller 301 comprises the communication module 310, the processing module 320 and the memory 330. The environment controller 301 may also comprise the display 340 and the user interface 350. The communication module 310 comprises the Wi-Fi hotspot functionality 312, and at least one of the Wi-Fi client functionality 314 and the mesh client functionality 316.

The environment controller 301 establishes the first Wi-Fi hotspot 210 via the Wi-Fi hotspot functionality 312. After establishment of the first Wi-Fi hotspot 210, other ECDs which need to communicate with the environment controller 301 by means of the first Wi-Fi hotspot 210 associate with the first Wi-Fi hotspot 210. The association procedure is performed as known in the art. The Wi-Fi hotspot functionality 312 may be pre-configured with the proper parameters (e.g. Service Set Identifier (SSID), password). The other ECDs may have the parameters needed to associate with the first Wi-Fi hotspot 210 pre-configured as well. Alternatively, a user may configure the other ECDs for the association, for example in the case where several different hotspots are available. Technologies like Quick Response (QR) codes or Near Field Communication (NFC) may also be used to automate the configuration process. The environment controller 301 is then capable of communicating with other ECDs (such as a sensor 302, a controlled appliance 303 and a relay 304) via the first Wi-Fi hotspot 210.

If the communication module 310 comprises a Wi-Fi client functionality 314, the environment controller 301 associates with the second Wi-Fi hotspot (which has been established by another ECD) via the Wi-Fi client functionality 314. The environment controller 301 is then capable of communicating with other ECDs (such as a sensor 302, a controlled appliance 303 and a relay 304) via the second Wi-Fi hotspot.

If the communication module 310 comprises a mesh client functionality 316, the environment controller 301 advertises its presence on the mesh network and discovers other nodes on the mesh network, in any manner known in the art. The environment controller 301 is then capable of communicating with other ECDs (such as a sensor 302, a controlled appliance 303 and a relay 304) via the mesh network.

The processing module 320 receives an environmental characteristic value from a sensor 302 via the wireless communication infrastructure 318, and determines an environmental state based on the received environmental characteristic value. Then, the processing module 320 generates a command based on the environmental state, and transmits the command to a corresponding controlled appliance 303 via the wireless communication infrastructure 318. The environmental characteristic value may be immediately processed upon reception by the processing module 320, to generate the command. Alternatively, the environmental characteristic value may be stored in the memory 330, and processed later by the processing module 320 to generate the command. A command may also be generated based on several received environmental characteristic values.

The processing module 320 may also receive an environmental characteristic value from a relay 304 via the wireless communication infrastructure 318. The processing module 320 may also transmit a command to a relay 304 via the wireless communication infrastructure 318. For example, the environment controller 301 may receive an environmental characteristic value from a sensor 302 and transmit a corresponding command to a relay 304. The environment controller 301 may also receive an environmental characteristic value from a relay 304 and transmit a corresponding command to a controlled appliance 303 (or alternatively to the same or another relay 304).

The environment controller 301 may be capable of receiving a plurality of environmental characteristic values from a plurality of ECDs via the wireless communication infrastructure 318, determining a plurality of environmental states based on the plurality of environmental characteristic values, generating a plurality of commands based on the plurality of environmental states, and transmitting the plurality of commands to a plurality of ECDs via the wireless communication infrastructure 318.

The environment controller 301 may also communicate with a configuration/maintenance terminal 410 via the wireless communication infrastructure 318. For example, the processing module 320 may receive data (e.g. configuration files, software upgrades, etc.) from the configuration/maintenance terminal 410, and store them in the memory 330. The configuration files may include a list of devices (e.g. sensors 302, controlled appliances 303, and relays 304) which are authorized to associate with the first Wi-Fi hotspot 210 established by the Wi-Fi hotspot functionality 312. Thus, a request of association from a device may be accepted or refused by the Wi-Fi hotspot functionality 312, based on the presence of the requesting device in the list of authorized devices. The processing module 320 may also maintain a list of all the devices currently associated with the first Wi-Fi hotspot 210, and transmit the list to the configuration/maintenance terminal 410.

The environment controller 301 may also communicate with other types of ECDs over the wireless communication infrastructure 318, via its communication module 310. For example, the environment controller 310 may communicate with a master environment controller (as illustrated in FIG. 2), or with peer environment controllers.

Figure 5:
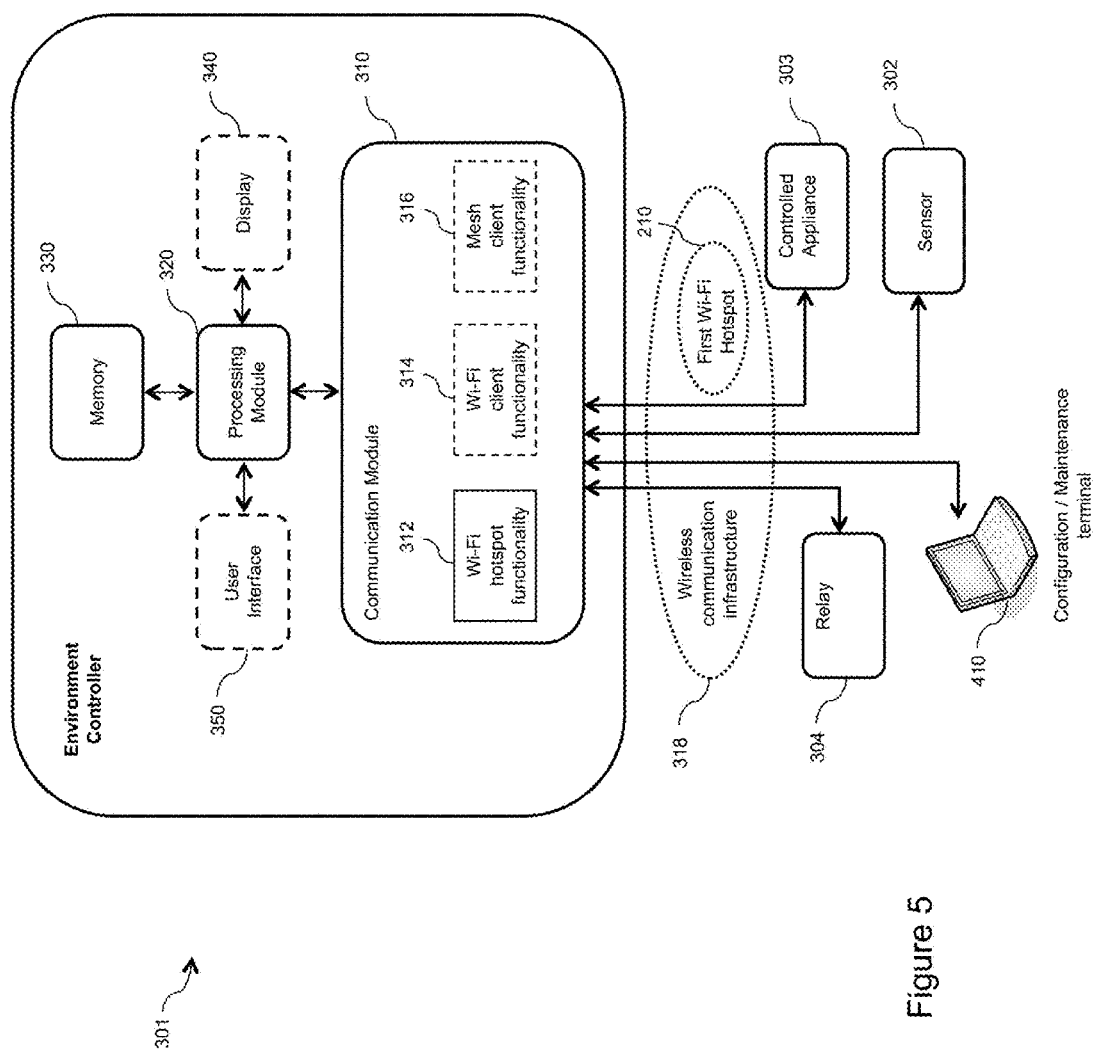
FIG. 5 illustrates an environment controller as an exemplary ECD.

The environment controller 301 may also comprise a wired communication module (not represented in FIG. 5), to communicate with wired ECDs (not represented in FIG. 5) via wires (not represented in FIG. 5).

Sensor

Figure 6:
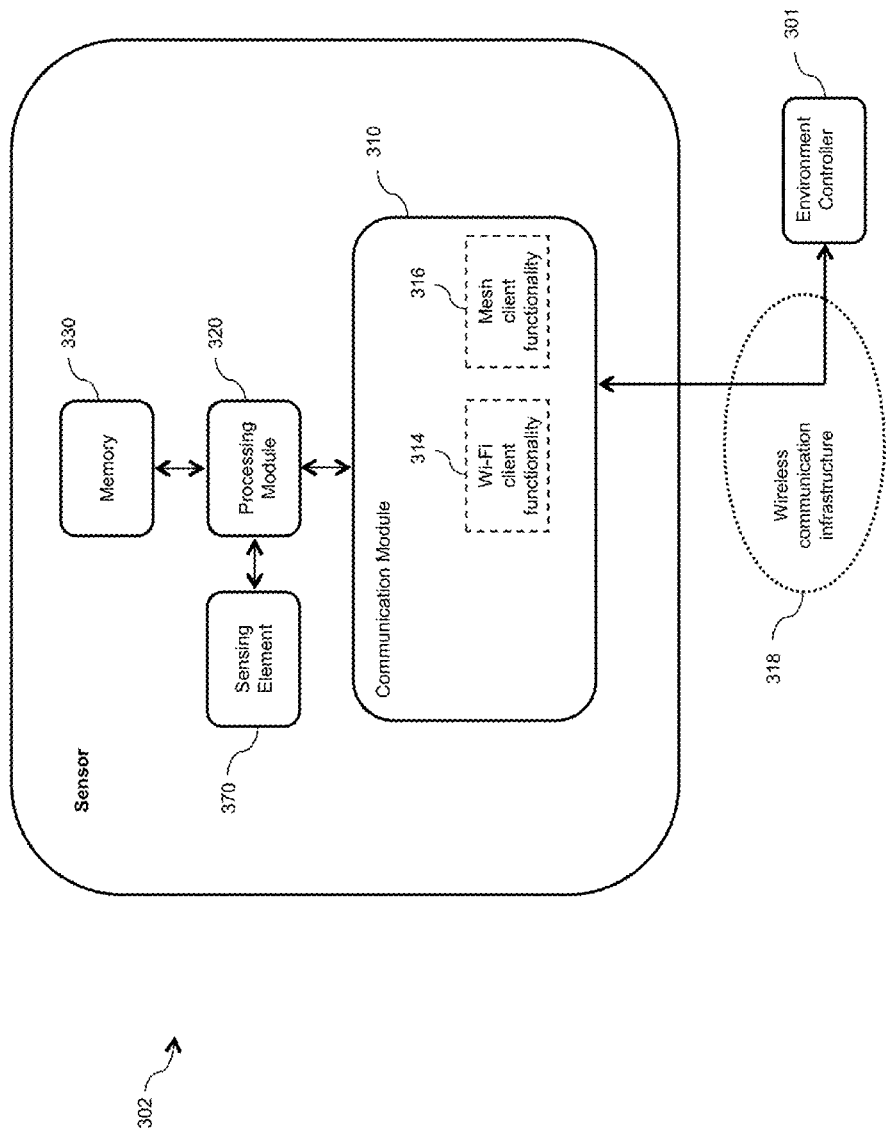
FIG. 6 illustrates a sensor as an exemplary ECD.
Figure 9B:
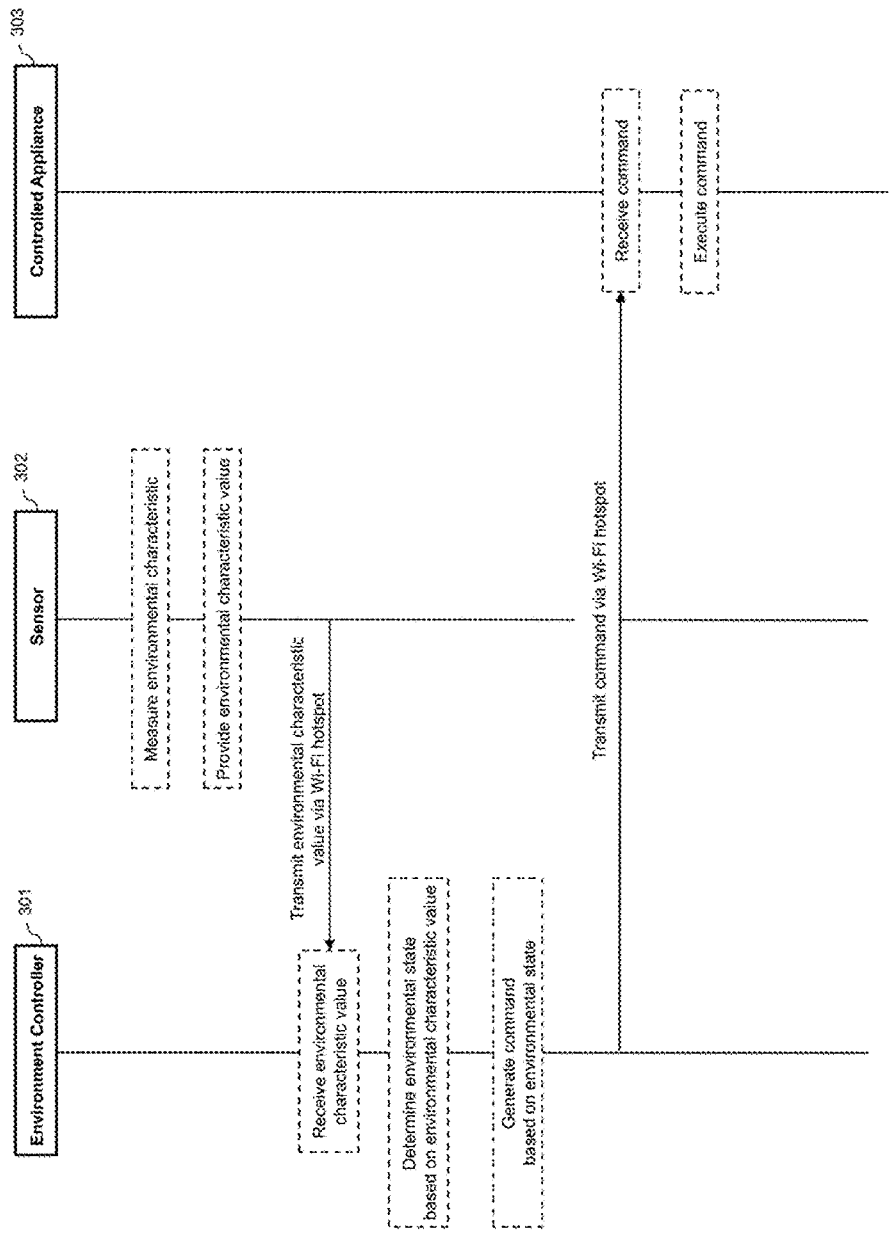

Referring now to FIGS. 6, 9A and 9B concurrently, a sensor 302 is illustrated. The sensor 302 is a specific type of ECD capable of measuring an environmental characteristic, providing a corresponding environmental characteristic value, and transmitting the environmental characteristic value to an environment controller 301 via the wireless communication infrastructure 318. In this case, the wireless communication infrastructure 318 comprises at least one of a first Wi-Fi hotspot established by the environment controller 301 and a mesh network.

The sensor 302 comprises the communication module 310, the processing module 320, the memory 330, and a sensing element 370. The communication module 310 comprises at least one of a Wi-Fi client functionality 314 for communicating over the first Wi-Fi hotspot and a mesh client functionality for communicating over the mesh network.

If the communication module 310 comprises a Wi-Fi client functionality 314, the sensor 302 associates with the first Wi-Fi hotspot (which has generally been established by an environment controller 301) via the Wi-Fi client functionality 314. The sensor 302 is then capable of communicating with the environment controller 301 via the first Wi-Fi hotspot.

If the communication module 310 comprises a mesh client functionality 316, the sensor 302 advertises its presence on the mesh network and discovers other nodes on the mesh network, in any manner known in the art. The sensor 302 is then capable of communicating with an environment controller 301 via the mesh network.

The sensing element 370 measures an environmental characteristic and provides a corresponding environmental characteristic value. The environmental characteristic value is transmitted by the sensing element 370 to the processing module 320, where it is optionally further processed. Then, the processing module 320 transmits the environmental characteristic value to an environment controller 301 via the wireless communication infrastructure 318.

The sensor 302 may also communicate with other types of ECDs over the wireless communication infrastructure 318, via its communication module 310. For example, the sensor 302 may communicate with a relay, which relays the data transmitted between the sensor 302 and an environment controller. The sensor 302 may also communicate with a configuration/maintenance terminal as illustrated in FIG. 5.

In a particular aspect, the processing module 320 and/or memory 330 may be absent, or integrated with the sensing element 370.

In another particular aspect, the communication module 310 of the sensor 302 may also comprise a Wi-Fi hotspot functionality (not represented in FIG. 6) for establishing a second Wi-Fi hotspot. In this case, the wireless communication infrastructure 318 also comprises the second Wi-Fi hotspot and the sensor 302 is capable of communicating with other ECDs which are associated with the second Wi-Fi hotspot.

The sensor 400 may (for illustration purposes only and without limitation) be capable of performing one of: a temperature measurement, a humidity measurement, an air pressure measurement, a voltage measurement, an apparatus on/off status determination, a carbon monoxide detection, a flood detection, an intrusion alarm and a fire alarm.

Controlled Appliance

Figure 7:
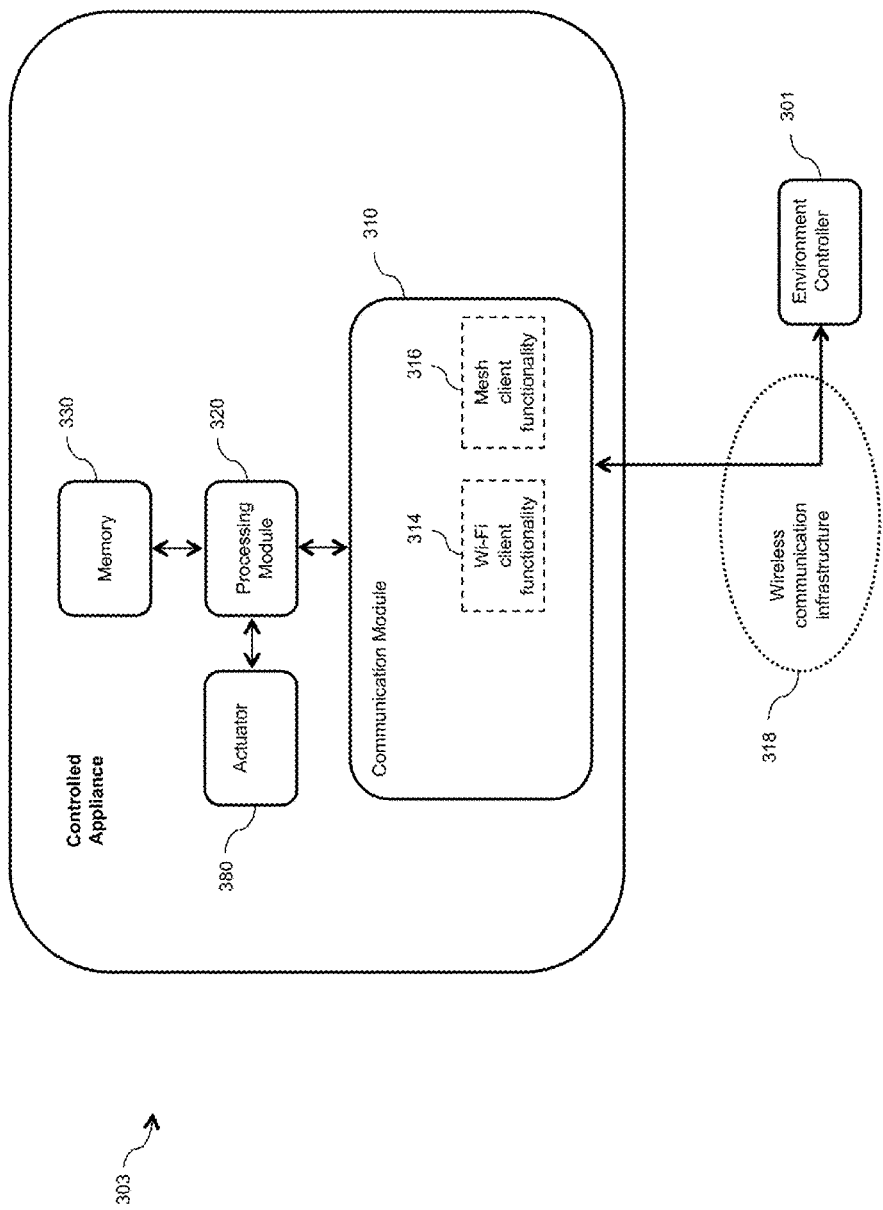
FIG. 7 illustrates a controlled appliance as an exemplary ECD.

Referring now to FIGS. 7, 9A and 9B concurrently, a controlled appliance 303 is illustrated. The controlled appliance 303 is a specific type of ECD capable of receiving a command from an environment controller 301 via the wireless communication infrastructure 318 and executing the command. In this case, the wireless communication infrastructure 318 comprises at least one of a first Wi-Fi hotspot established by the environment controller 301 and a mesh network.

The controlled appliance 303 comprises the communication module 310, the processing module 320, the memory 330, and an actuator 380. The communication module 310 comprises at least one of a Wi-Fi client functionality 314 for communicating over the first Wi-Fi hotspot and a mesh client functionality for communicating over the mesh network.

If the communication module 310 comprises a Wi-Fi client functionality 314, the controlled appliance 303 associates with the first Wi-Fi hotspot (which has generally been established by an environment controller 301) via the Wi-Fi client functionality 314. The controlled appliance 303 is then capable of communicating with the environment controller 301 via the first Wi-Fi hotspot.

If the communication module 310 comprises a mesh client functionality 316, the controlled appliance 303 advertises its presence on the mesh network and discovers other nodes on the mesh network, in any manner known in the art. The controlled appliance 303 is then capable of communicating with an environment controller 301 via the mesh network.

The processing module 320 receives a command from an environment controller 301 via the wireless communication infrastructure 318. The command is optionally processed and then executed by the processing module 320. The execution of the command generally actuates the actuator 380.

The controlled appliance 303 may also communicate with other types of ECDs over the wireless communication infrastructure 318, via its communication module 310. For example, the controlled appliance 303 may communicate with a relay, which relays the data transmitted between the controlled appliance 303 and an environment controller. The controlled appliance 303 may also communicate with a configuration/maintenance terminal as illustrated in FIG. 5.

In a particular aspect, the processing module 320 and/or memory 330 may be absent, or integrated with the actuator 380.

In another particular aspect, the communication module 310 of the controlled appliance 303 may also comprise a Wi-Fi hotspot functionality (not represented in FIG. 7) for establishing a second Wi-Fi hotspot. In this case, the wireless communication infrastructure 318 also comprises the second Wi-Fi hotspot and the controlled appliance 303 is capable of communicating with other ECDs which are associated with the second Wi-Fi hotspot.

The controlled appliance may (for illustration purposes only and without limitation) consist of one of: a temperature thermostat, a ventilation system, an apparatus on/off switch, a surveillance camera.

Relay

A relay is a specific type of ECD allowing an exchange of environmental data between ECDs only using wires as communication means, and ECDs using a wireless communication infrastructure as communication means. A relay may be used when it is not possible, or too costly, to upgrade legacy ECDs with a wireless communication module.

Figure 8:
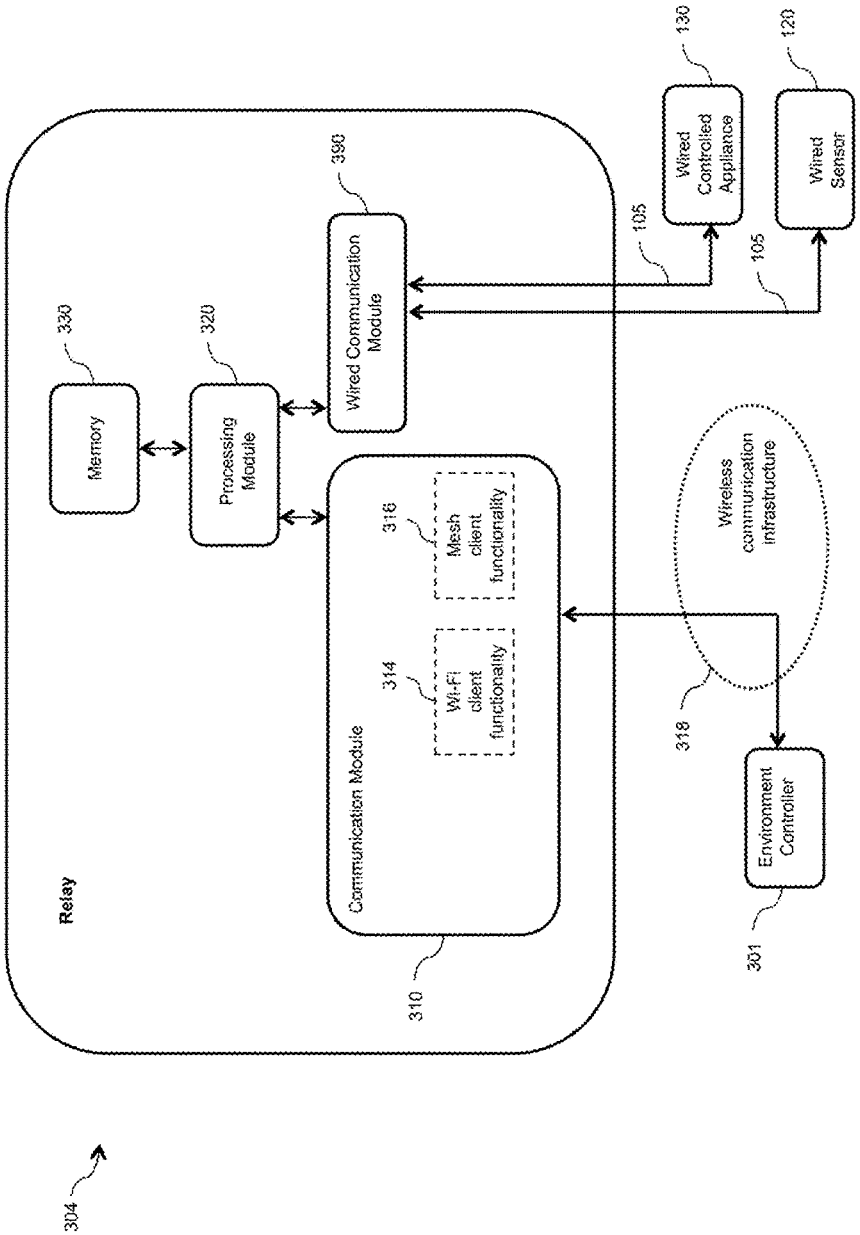
FIG. 8 illustrates a relay as an exemplary ECD.
Figure 10A:
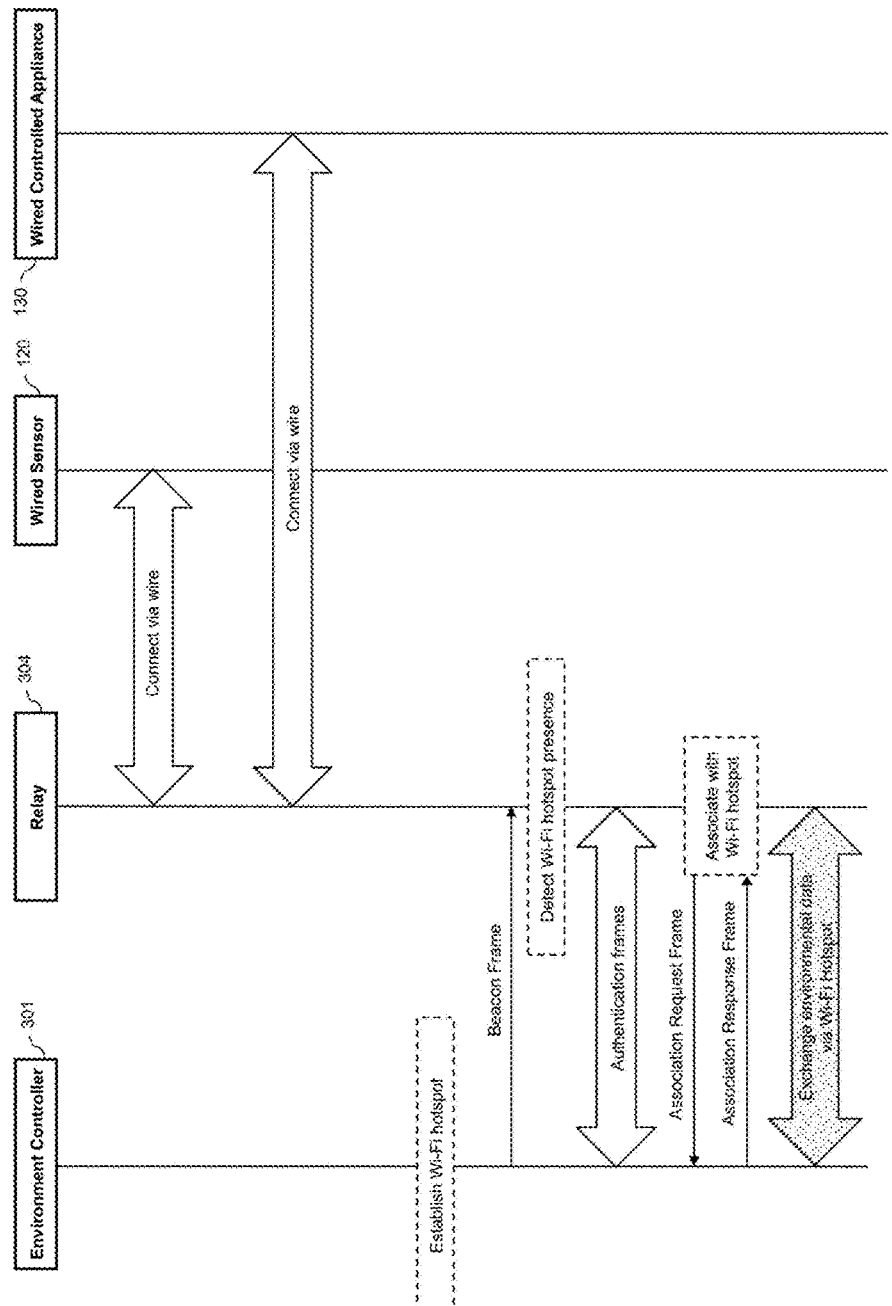
FIGS. 10A and 10B illustrate another exemplary Wi-Fi hotspot signal flow for the present environment control method.
Figure 10B:
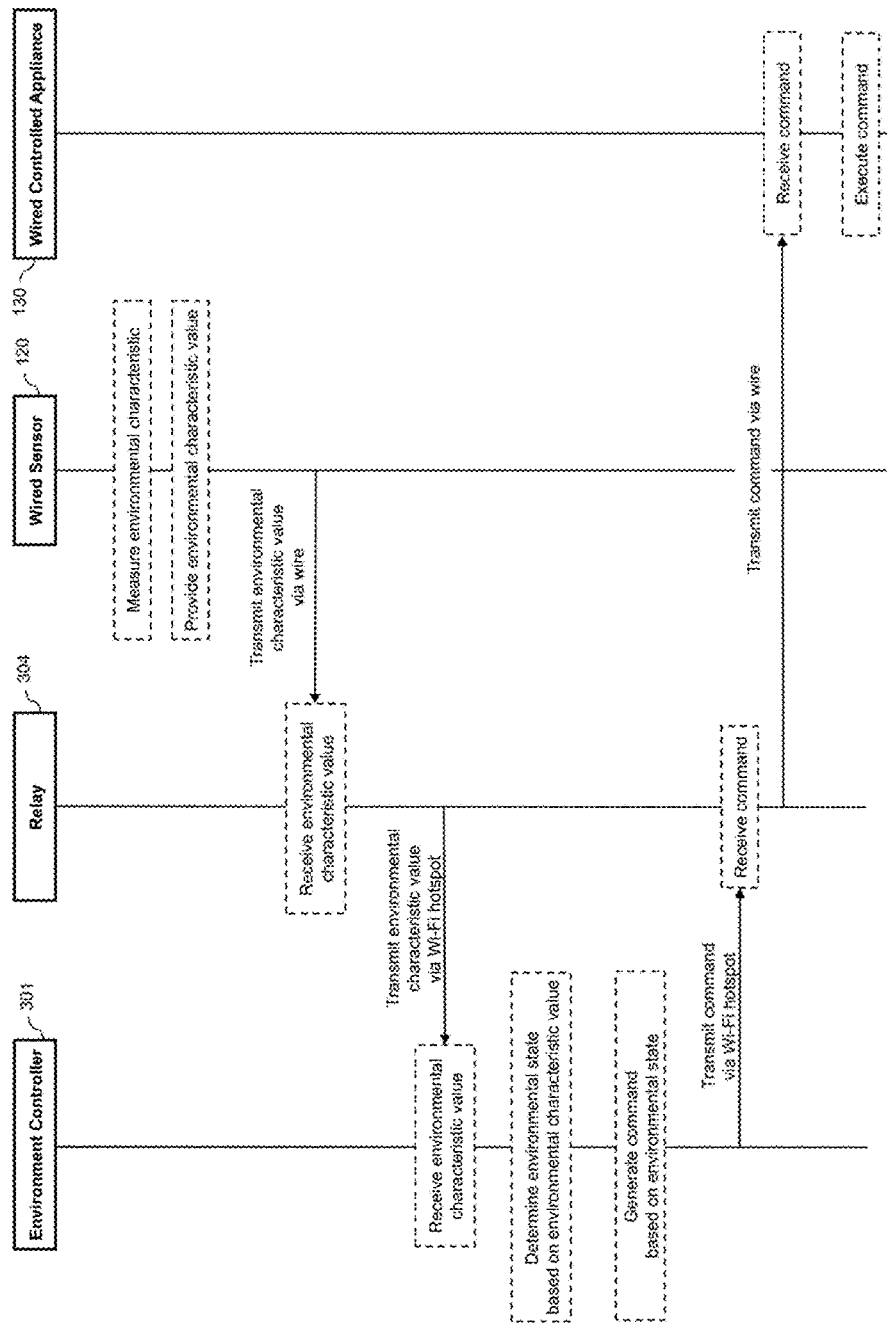

Referring now to FIGS. 8, 10A and 10B concurrently, a relay 304 is illustrated. The relay 304 is capable of receiving an environmental characteristic value from a wired sensor 120 via a wire 105, and transmitting the environmental characteristic value to an environment controller 301 via the wireless communication infrastructure 318. The relay 304 is also capable of receiving a command from an environment controller 301 via the wireless communication infrastructure 318, and transmitting the command to a wired controlled appliance 130 via a wire 105. In this case, the wireless communication infrastructure 318 comprises at least one of a first Wi-Fi hotspot established by the environment controller 301 and a mesh network.

The relay 304 comprises the (wireless) communication module 310, the processing module 320, the memory 330, and a wired communication module 390. The communication module 310 comprises at least one of a Wi-Fi client functionality 314 for communicating over the first Wi-Fi hotspot and a mesh client functionality for communicating over the mesh network.

If the communication module 310 comprises a Wi-Fi client functionality 314, the relay 304 associates with the first Wi-Fi hotspot (which has generally been established by an environment controller 301) via the Wi-Fi client functionality 314. The relay 304 is then capable of communicating with the environment controller 301 via the first Wi-Fi hotspot.

If the communication module 310 comprises a mesh client functionality 316, the relay 304 advertises its presence on the mesh network and discovers other nodes on the mesh network, in any manner known in the art. The relay 304 is then capable of communicating with an environment controller 301 via the mesh network.

The wired communication module 390 connects the relay 304 with at least one wired sensor 120 and/or at least one wired controlled appliance 130 via a wire 105. The wired sensor 120 measures an environmental characteristic and provides the environmental characteristic value, which is transmitted to the wired communication module 390 via a wire 105. The wired controlled appliance 130 receives a command from the wired communication module 390 via a wire 105, and executes the command.

The processing module 320 receives the environmental characteristic value from the wired sensor 120 via a wire 105 (through the wired communication module 390), and transmits the environmental characteristic value to an environment controller 301 via the wireless communication infrastructure 318. The processing module 320 receives the command from the environment controller 301 via the wireless communication infrastructure 318, and transmits the command to the wired controlled appliance 130 via a wire 105 (through the wired communication module 390).

The relay 304 may communicate with one or several environment controllers 301 over the wireless communication infrastructure 318. The relay 304 may also communicate with other types of ECDs over the wireless communication infrastructure 318, via its communication module 310. For example, the relay 304 may also communicate with a configuration/maintenance terminal as illustrated in FIG. 5.

In a particular aspect, the communication module 310 of the relay 304 may also comprise a Wi-Fi hotspot functionality (not represented in FIG. 8) for establishing a second Wi-Fi hotspot. In this case, the wireless communication infrastructure 318 also comprises the second Wi-Fi hotspot and the relay 304 is capable of communicating with other ECDs which are associated with the second Wi-Fi hotspot. For example, FIG. 2 illustrates an environment control system 200 with a relay 260 having a Wi-Fi hotspot functionality for communicating with a sensor 222 and a controlled appliance 232, and a Wi-Fi client functionality for communicating with an environment controller 250.

Wi-Fi Hotspot and Wi-Fi Client Functionalities

Referring now to FIGS. 5, 6, 7, 8, 9A and 10A concurrently, the Wi-Fi hotspot functionality 312 and the Wi-Fi client functionality 314 of the communication module 310 will be detailed.

FIG. 9A illustrates the establishment of the Wi-Fi hotspot 210 by the Wi-Fi hotspot functionality 312 of the environment controller 301, and the association with the Wi-Fi hotspot 210 by the Wi-Fi client functionality 314 of the sensor 302 and of the controlled appliance 303.

FIG. 10A illustrates the establishment of the Wi-Fi hotspot 210 by the Wi-Fi hotspot functionality 312 of the environment controller 301, and the association with the Wi-Fi hotspot 210 by the Wi-Fi client functionality 314 of the relay 304.

The Wi-Fi hotspot functionality 312 and the Wi-Fi client functionality 314 are well known in the art and comply with existing 802.11 standards.

The establishment of the Wi-Fi hotspot 210 by the Wi-Fi hotspot functionality 312 consists for example in establishing a 802.11 Access Point operating in infrastructure mode. Once the Wi-Fi hotspot 210 is established by the Wi-Fi hotspot functionality 312, a beacon frame is broadcasted. The Wi-Fi client functionality 314 is capable of receiving and interpreting the beacon frame, and thus detecting the presence of the Wi-Fi hotspot 210. The beacon frame comprises capability information related to the Wi-Fi hotspot 210, which are used by the Wi-Fi client functionality 314 to perform the association with the Wi-Fi hotspot 210. Instead of using the beacon frame mechanism, the Wi-Fi client functionality 314 may send a probe request message and receive a probe response message from the Wi-Fi hotspot functionality 312, containing the capability information.

The association with the Wi-Fi hotspot 210 is preceded by an authentication phase, during which authentication frames are exchanged between the Wi-Fi client functionality 314 and the Wi-Fi hotspot functionality 312. In general, the client authenticates itself to the Wi-Fi hotspot 210, but the Wi-Fi hotspot 210 may also have to authenticate itself to the client. The authentication phase may be absent, although it is not recommended for security reasons. During the authentication phase, security material (including for example keys and certificates) are exchanged, which are further used to encrypt all the communications between the Wi-Fi client functionality 314 and the Wi-Fi hotspot functionality 312. Multiple authentication and security protocols are supported by the 802.11 standards, for example Wi-Fi Protected Access (WPA) and WPA2.

Once the authentication phase is successfully completed, an association request frame is sent by the Wi-Fi client functionality 314 to the Wi-Fi hotspot functionality 312, and an association response frame is sent by the Wi-Fi hotspot functionality 312 to the Wi-Fi client functionality 314. Then, the Wi-Fi client functionality 314 is successfully associated with the Wi-Fi hotspot 210, and can exchange environmental data via the Wi-Fi hotpot 210. In particular, the Wi-Fi client functionality 314 (of the sensor 302, controlled appliance 303, and relay 304) and the Wi-Fi hotspot functionality 312 (of the environment controller 301) can exchange environmental data via the Wi-Fi hotpot 210.

Protocol for Exchanging Environmental Data Over a Wi-Fi Hotspot

A dedicated environment control protocol may be used to support the exchange of environmental data between ECDs. The environment control protocol is an application layer protocol.

For communications over wires, the environment control protocol layer is above dedicated wired communication protocol layer(s) used to communicate over the wire.

For communications over a Wi-Fi hotspot, the environment control protocol layer may be directly above the Internet Protocol (IP) Layer, or alternatively above the Universal Datagram Protocol (UDP) or Transport Control Protocol (TCP) layer. An ECD communicating over the Wi-Fi hotspot may have a static or dynamic IP address, and has a unique Media Access Control Address (MAC). Specific control protocols like the Dynamic Host Configuration Protocol (DHCP) and/or the Domain Name System (DNS) protocol may be used to identify any ECD using the Wi-Fi hotspot knowing its current IP address (e.g. by using the unique MAC address of the ECD as a reference).

Environment Control Devices with Mesh Networking Capabilities

Figure 11A:
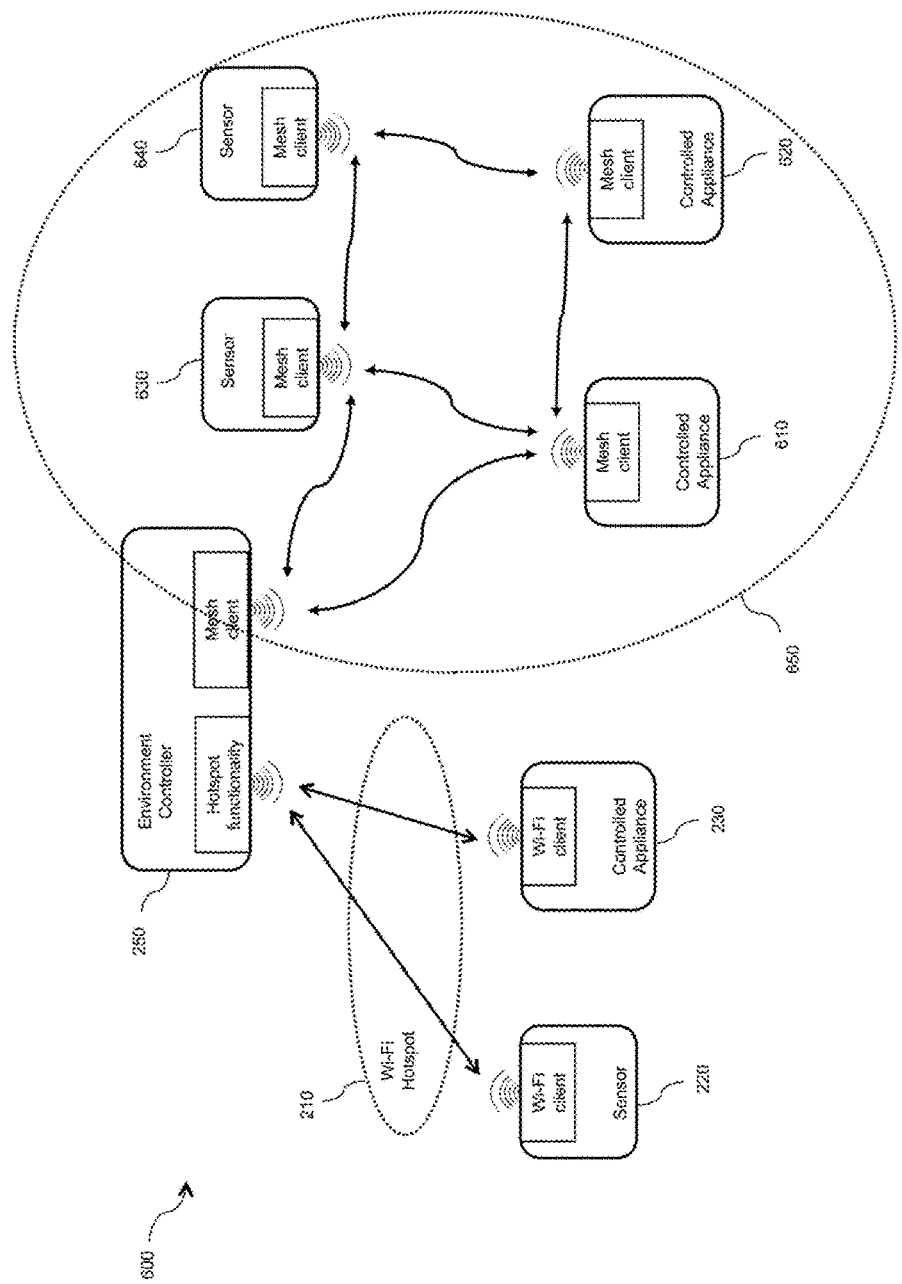
FIGS. 11A and 11B illustrate an environment control system with environment control devices (EGDs) with mesh networking capabilities.

Referring now to FIG. 11A, an environment control system 600 comprising ECDs having mesh networking capabilities for exchanging environmental data and/or commands is represented. Some ECDs may have mesh networking capabilities only, and some ECDs may have a combination of mesh networking capabilities and Wi-Fi hotspot networking capabilities.

For illustration purposes, the environment control system 600 comprises ECDs (220, 230 and 250) using a Wi-Fi hotspot 210 for exchanging environmental data and/or commands and ECDs (610, 620, 630, 640 and 250) using a mesh network 650 for exchanging environmental data and/or commands.

The mesh network 650 is a self-organizing network, where each participating ECD has a mesh client providing the capability to communicate in a peer-to-peer manner with other ECDs having a mesh client. Data may be exchanged directly between two ECDs through a direct communication between their respective mesh clients. Alternatively, one or several ECDs may be used as a relay to transmit data from a source ECD to a destination ECD, via a hop by hop communication between their respective mesh clients.

The exemplary environment control system 600 comprises an environment controller 250 having a Wi-Fi hotspot functionality for establishing the Wi-Fi hotspot 210, and communicating with a sensor 220 having a Wi-Fi client and with a controlled appliance 230 having a Wi-Fi client. The communications over the Wi-Fi hotspot 210 are centralized, in the sense that any communication between two ECDs over the Wi-Fi hotspot 210 necessarily pass through the environment controller 250 having the Wi-Fi hotspot functionality.

The exemplary environment control system 600 also comprises the mesh network 650 allowing decentralized communications between ECDs having a mesh client. For instance, the environment controller 250 can communicate directly with the controlled appliance 610 and with the sensor 630 through their respective mesh clients. The environment controller 250 can also communicate with the controlled appliance 620 using the controlled appliance 610 as a relay, via a hop by hop communication between their respective mesh clients. Similarly, the environment controller 250 can communicate with the sensor 640 using the sensor 630 as a relay, via a hop by hop communication between their respective mesh clients. Alternatively, the environment controller 250 could communicate with the sensor 640 using the controlled appliances 610 and 620 as relays, if the sensor 630 cannot be used as a relay (for instance if the sensor 630 is temporarily out of order). This example illustrates the flexibility offered by a mesh network: the communication path between two ECDs does not depend on a single point of failure and can be adapted in real time to the operating conditions of the various ECDs participating in the mesh network 650.

The usage of a sensor or a controlled appliance with a mesh client or with a Wi-Fi client may depend on various deployment factors, such as the distance with the environment controller 250, the environment in which the sensor or the controlled appliance is deployed, the quantity of data to be transmitted and the frequency of transmission, the criticality of the transmitted data (no single point of failure with a mesh network), etc.

The mesh clients may use the 802.11s protocol for establishing a Wi-Fi mesh network 650. This may simplify the implementation of the environment controller 250, since its hotspot and mesh client functionalities are then based on a common root standard: 802.11.

Figure 11B:
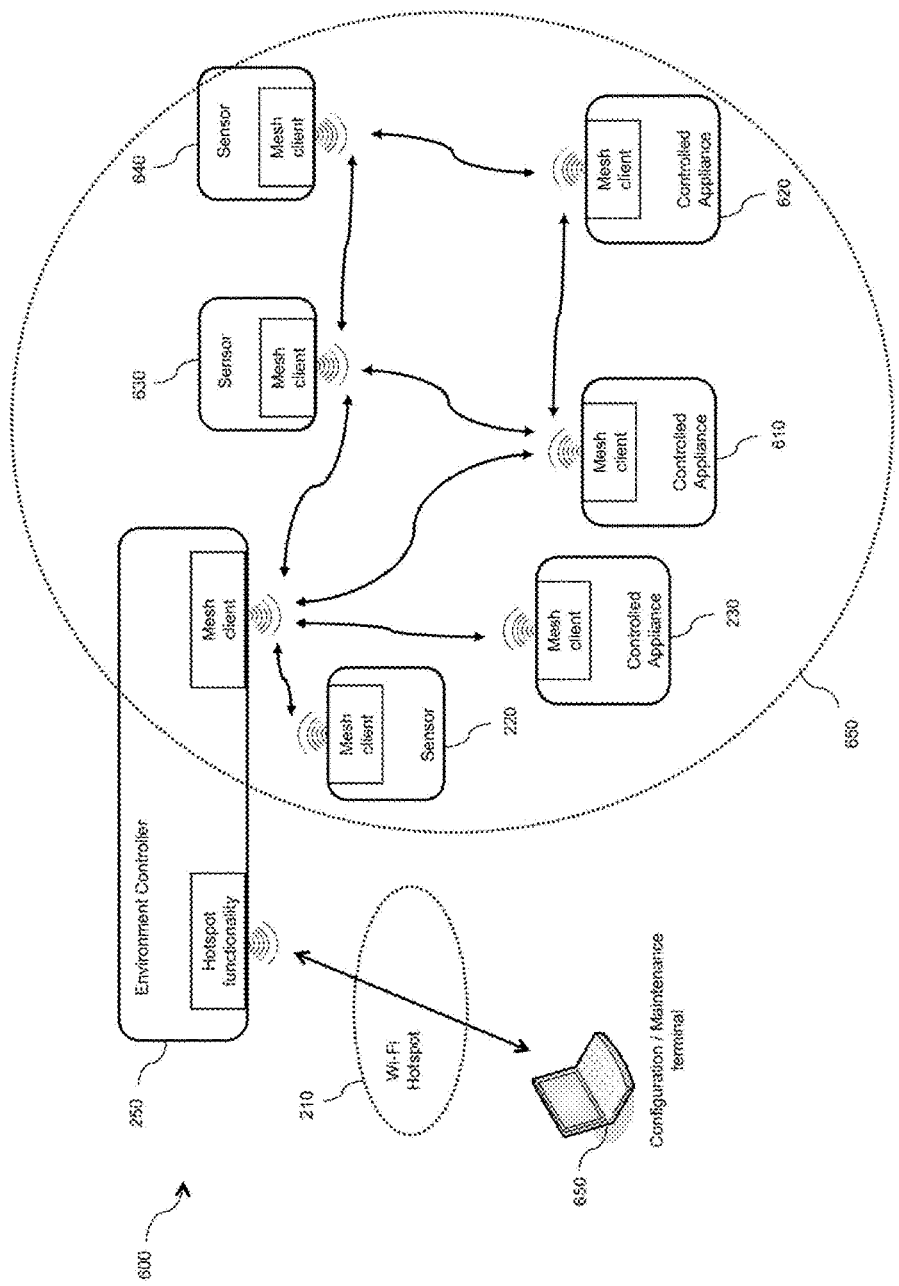

Referring now to FIG. 11B, an alternative environment control system 600 is represented, where all the ECDs (610, 620, 630, 640, 220, 230 and 250) have a mesh client and use the mesh network 650 for exchanging environmental data and/or commands.

The environment controller 250 also has a Wi-Fi hotspot functionality for establishing the Wi-Fi hotspot 210, and communicating with other devices, such as for example configuration and maintenance terminals 650. A configuration of the environment controller 250 can be transmitted directly by the configuration terminal 650 to the environment controller 250 via the Wi-Fi hotspot 210. A configuration of another ECD (e.g. sensor 630 or controlled appliance 610) can be first transmitted by the configuration terminal 650 to the environment controller 250 via the Wi-Fi hotspot 210, and then forwarded to the destination ECD (e.g. 630 or 610) via the mesh network 650. Thus, a sensor (e.g. 630) or a controlled appliance (e.g. 610) does not need to embed a Wi-Fi client for being configured by a configuration terminal 650 having Wi-Fi communication capabilities only (and no mesh communication capabilities).

Additionally, the Wi-Fi hotspot functionality of the environment controller 250 could be used to provide access to an Intranet or to the Internet to various devices (not represented in FIG. 11B) via the Wi-Fi hotspot 210. In this case, the environment controller 250 need to be connected to the Intranet or to the Internet via an additional connection (e.g. an Ethernet cable connection) not represented in FIG. 11B.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. An environment controller, comprising:
   a communication module comprising:
      a Wi-Fi hotspot functionality, the Wi-Fi hotspot functionality establishing a local Wi-Fi hotspot and exchanging environmental data with other devices through the local Wi-Fi hotspot; and
      a Wi-Fi client functionality, the Wi-Fi client functionality simultaneously directly associating the environment controller with a remote Wi-Fi hotspot and exchanging environmental data with other devices through the remote Wi-Fi hotspot; and
   a processing module, the processing module performing at least one of the two following operations:
      a first operation comprising receiving an environmental characteristic value generated by a sensor via the Wi-Fi hotspot functionality, determining an environmental state based on the received environmental characteristic value, generating a command for controlling a controlled appliance based on the environmental state, and transmitting the command via the Wi-Fi client functionality; and
      a second operation comprising receiving an environmental characteristic value generated by a sensor via the Wi-Fi client functionality, determining an environmental state based on the received environmental characteristic value, generating a command for controlling a controlled appliance based on the environmental state, and transmitting the command via the Wi-Fi hotspot functionality.

2. The environment controller of claim 1, further comprising a USB controller, the USB controller receiving a USB key implementing the communication module.

3. The environment controller of claim 1, wherein the processing module is capable of:
   receiving a plurality of environmental characteristic values generated by a plurality of sensors via the Wi-Fi hotspot functionality of the communication module;
   determining a plurality of environmental states based on the plurality of environmental characteristic values;
   generating a plurality of commands for controlling a plurality of controlled appliances based on the plurality of environmental states; and
   transmitting the plurality of commands via the Wi-Fi client functionality of the communication module.

4. The environment controller of claim 1, wherein the processing module is capable of:
   receiving a plurality of environmental characteristic values generated by a plurality of sensors via the Wi-Fi client functionality of the communication module;
   determining a plurality of environmental states based on the plurality of environmental characteristic values;
   generating a plurality of commands for controlling a plurality of controlled appliances based on the plurality of environmental states; and
   transmitting the plurality of commands via the Wi-Fi hotspot functionality of the communication module.

5. An environment control method, comprising:
   implementing a Wi-Fi hotspot functionality by an environment controller, the Wi-Fi hotspot functionality establishing a local Wi-Fi hotspot and exchanging environmental data with other devices through the local Wi-Fi hotspot;
   implementing a Wi-Fi client functionality by the environment controller, the Wi-Fi client functionality simultaneously directly associating the environment controller with a remote Wi-Fi hotspot and exchanging environmental data with other devices through the remote Wi-Fi hotspot;
   performing at least one of the two following operations by a processing module of the environment controller:
      a first operation comprising receiving an environmental characteristic value generated by a sensor via the Wi-Fi hotspot functionality, determining an environmental state based on the received environmental characteristic value, generating a command for controlling a controlled appliance based on the environmental state, and transmitting the command via the Wi-Fi client functionality; and a second operation comprising receiving an environmental characteristic value generated by a sensor via the Wi-Fi client functionality, determining an environmental state based on the received environmental characteristic value, generating a command for controlling a controlled appliance based on the environmental state, and transmitting the command via the Wi-Fi hotspot functionality.

6. The method of claim 5, wherein a communication module implemented by a USB key performs the Wi-Fi hotspot functionality and the Wi-Fi client functionality, the USB key being received by a USB controller of the environment controller.

7. The method of claim 5, wherein the processing module of the environment controller:

receives a plurality of environmental characteristic values generated by a plurality of sensors via the Wi-Fi hotspot functionality;

determines a plurality of environmental states based on the plurality of environmental characteristic values;

generates a plurality of commands for controlling a plurality of controlled appliances based on the plurality of environmental states; and transmits the plurality of commands via the Wi-Fi client functionality.

8. The method of claim 5, wherein the processing module of the environment controller:

receives a plurality of environmental characteristic values generated by a plurality of sensors via the Wi-Fi client functionality;

determines a plurality of environmental states based on the plurality of environmental characteristic values;

generates a plurality of commands for controlling a plurality of controlled appliances based on the plurality of environmental states; and transmits the plurality of commands via the Wi-Fi hotspot functionality.

* * * * *